United States Patent [19]

Numakura et al.

[11] Patent Number: 5,313,310
[45] Date of Patent: May 17, 1994

[54] TONAL CONVERSION METHOD FOR PICTURES

[75] Inventors: Takashi Numakura; Iwao Numakura, both of Tokyo, Japan

[73] Assignee: Yamatoya & Co., Ltd., Tokyo, Japan

[21] Appl. No.: 481,054

[22] Filed: Feb. 16, 1990

[30] Foreign Application Priority Data

May 31, 1989 [JP] Japan ................... 1-135825

[51] Int. Cl.⁵ .............................. H04N 1/40
[52] U.S. Cl. .................... 358/456; 358/455; 358/298
[58] Field of Search ........... 358/448, 450, 452, 455, 358/456, 458, 461, 462, 463, 464, 465, 466, 467, 75, 80, 296, 298

[56] References Cited

U.S. PATENT DOCUMENTS

| | | | |
|---|---|---|---|
| 4,811,108 | 3/1989 | Numakura et al. | 358/298 |
| 4,833,546 | 5/1989 | Numakura et al. | 358/298 |
| 4,924,323 | 5/1990 | Numakura et al. | 358/456 |
| 4,956,718 | 9/1990 | Numakura et al. | 358/298 |
| 5,057,931 | 10/1991 | Numakura et al. | 358/456 |
| 5,072,305 | 12/1991 | Numakura et al. | 358/456 |
| 5,134,494 | 7/1992 | Numakura et al. | 358/80 |

Primary Examiner—Edward L. Coles, Sr.
Assistant Examiner—Jerome Grant, II
Attorney, Agent, or Firm—Wenderoth, Lind & Ponack

[57] ABSTRACT

Disclosed herein is a tonal conversion method of a picture useful upon producing a reproduced picture such as hard or soft reproduced picture from an original picture recorded or otherwise stored on a recording medium. Tonal conversion is conducted in such a way that the pictorial information value ($X_n$) of a picture element on a camera subject; i.e., real picture corresponding to a desired picture element on the original picture, i.e., medium picture is obtained from a density information value ($D_n$) relating to the density information of the desired picture or the original picture or the medium picture, and converting the thus-obtained pictorial information value ($X_n$) into a tone intensity value (y) by using a specific tonal conversion formula.

13 Claims, 6 Drawing Sheets

TONAL CONVERSION METHOD FOR PICTURES

FIELD OF THE INVENTION

This invention relates to a tonal conversion method of picture, which is indispensable upon producing various types of reproduced pictures including hard pictures such as printed pictures, and reproduced digital pictures, and soft pictures (transient images displayed optically) such as CRT (video) pictures from original pictures (which will hereinafter be equally called "medium pictures") stored and recorded on various recording media such as photographic photosensitive materials, photoelectric materials, and photoconductive materials.

More specifically, this invention relates to an improved tonal conversion method in which an attention is paid to physical quantities correlating densities of a camera subject (real picture or actual scene) which is a basis of an original picture (medium picture) such as light exposures incident from the camera subject in the case of a photographic picture, said physical quantities relating to light quantities incident from a camera subject being going to be hereinafter called "pictorial information values". On the contrary, a conventional tonal conversion technique in which an attention is paid to values of an original picture (medium picture) recorded on a recording medium or physical quantities correlating to density values such as current or voltage values stored on a photoelectric material such as CCD. Incidentally, the term "pictures" as used herein should be interpreted in a broad sense so that it embraces not only pictures themselves but also images.

In other words, the present invention relates to a novel tonal conversion method in which the picture information obtained from a camera subject (real picture, actual scene), which should be a direct object for a reproduced picture, is considered more important than the picture information obtained from an original picture (medium picture), which is put a stress thereon in the conventional method.

Incidentally, the tonal conversion method of this invention relates not only to a method for a reproduced picture having a tone faithful to its original picture therefrom but also to a method for adjusting (correcting or modifying) the tone of the reproduced picture as desired.

BACKGROUND OF THE INVENTION

Reproduced pictures such as printed pictures, reproduced pictures, printer pictures, television (Video) pictures, etc. are produced from original pictures of continuous tone by various types of reproduction techniques, as known well. Incidentally, the term "reproduced pictures" should be interpreted in a broadest sense as described above. In production of these reproduced pictures, it is extremely important to faithfully reproduce the gradation and tone of an original picture on its reproduced picture in a systematic manner. It is however the present state of art that no basic technique has yet been established to permit conversion of an original picture into a reproduced picture rationally and effectively in a systematic manner, in spite of advancement of the techniques for producing reproduced pictures in recent years.

This is attributed primarily to the fact that the technique for converting and processing a non-linear drawing in relation with the density range thereof, which is considered to become a basis of techniques for faithfully reproducing the tone (gradation and tone) of an original picture of continuous gradation on a reproduced picture and further for regulating (correcting or modifying) the tone of an original picture as desired, is totally dependent upon experiences and perception of man. Therefore, the technique still remains in a non-scientific and non-rational state, lacking a foundation of a rational theory therefor.

This will be discussed hereinafter to some extent by way of production of printed pictures as a representative and practical technique.

The conventional technique has no idea to rationally grasp the density characteristic of an original picture in the range of from highlight to shadow areas upon producing a printed color picture as a reproduced picture from a color film original. Approximately 90% of color original pictures are transparent type. Further, the conventional technique is totally dependent upon the experiences and perception of an operator upon determining a correlation of picture characteristics between an original picture and a printed reproduced picture, or upon setting color-separation characteristic curves (equally called "color-separation characteristic curves" or "halftone characteristic curves"), which determine a correlation between an original picture of continuous tone and a printed reproduced picture in halftone.

Upon producing a printed color picture in halftone from an original color picture, the original color picture is subjected to color separation by a color scanner to make color plates (C, M, Y and K, in general).

The color scanners or total scanners, which are highly mechatronized, are very expensive systems. One of the problems hold in the present field of art is that an operation rate of such scanners is still on an order as low as about 30% on average. Such the low operation rate of scanners is attributed to the fact that scanner-setting takes a considerable long time besides a considerable number of original pictures require rescanning because of unstable and unsatisfactory quality of the resulting reproduced picture obtained through color-separation.

Considering this in the light of a technical view, a plurality of technical elements in the color-separation work, for example color correction, density gradational conversion, etc., are not systematized in a good coordination, while color scanners highly advanced in mechatronics are used as working means for color separation, as previously described. The low operation rate of color scanners is attributed to the above fact. Concerning two technical elements, i.e., color correction and density tonal conversion, the color correction has been investigated closely in a scientific manner, as seen in the Masking equation or Neugebauer equation. On the other hand, density tonal conversion remains in a state lacking a rational theory therefor, thus heavily dependent upon experiences and perception of man. Namely, the problem is that which size of a halftone dot should be corresponded to a given picture element of an original color picture. Under such circumstances, machines and systems for color separation have been developed, although a basic technique for designing machines and systems is still in an immature level. Additionally, the practical work heavily depends on the experiences and perception of an operator, while using such expensive and highly advanced electronic color-separation system. From the above reasons, constant supply of printed color pictures having stable qualities is difficult in the present state. Specifically, there exists a serious problem in the case that a color original has been produced under in appropriate conditions such as photographing, exposing and developing conditions, or a color original has color-fog thereon. Namely, the conventional techniques fail to provide rational color separation work to cope with such the color originals of non-standard picture qualities. Furthermore, there exist another problems in the conventional techniques such as a low operation rate of scanners, unstable quality of a reproduced picture, increase of rescanning work, etc. as previously mentioned.

OBJECT AND SUMMARY OF THE INVENTION

The present inventors have a view that in order to establish a rational theory in the tonal conversion technique of pictures and produce rationally reproduced pictures having reproducibility of tone (gradation and tone) and further reproduced pictures having desired tone from various types of originals, a respect should be given to a technique capable of providing rational density conversion of each picture element of a picture, prior to giving an attention to an improvement of the color correction technique. Incidentally, it is well known that the density gradation of elements is reproduced on a reproduced picture by varying the size of the halftone dots or the like, by changing the arrangement of the defined dots, or by changing the density of the picture elements themselves. As seen in production of printed color pictures, an emphasis is laid on the color correction which is comparatively easy to be analyzed in a scientific manner in the conventional technique rather than the tonal conversion in the density range.

The present inventors have a view that in the conventional tonal conversion technique of pictures in the density range used upon producing a reproduced picture from an original color picture, a density characteristic of the original picture, for example a color film original picture for producing a printed color picture as a reproduced picture, in the range of from the highlight to shadow areas thereof is not rationally grasped, besides no rational theory has yet been established to determine a correlation (a tonal conversion formula) between two pictures (i.e., an original picture and a reproduced picture), which is indispensable upon faithfully converting the density characteristic of the original picture at the ratio of 1:1 into the reproduced picture. Therefore, the conventional technique is totally dependent upon the experiences and perception of man in this point.

Under such circumstances, the present inventors have proposed a tonal conversion technique of a picture using a specific tonal conversion formula therein, which is possible to make the tonal conversion of a picture a scientific and rational technique (U.S. Pat. Nos. 4,811,108 and 4,833,546; and U.S. patent application Ser. Nos. 07/347,620 and 07/390,910) now U.S. Pat. Nos. 4,924,323 & 4,956,718 respectively.

However, it was found in the following investigation that a certain limitation exists in the tonal conversion technique, where a specific tonal conversion formula is employed, previously proposed by the present inventors.

The limitation is that in the conventional technique including proposals by the present inventors, the tonal conversion of pictures is conducted on the basis of information values relating to density information of an original picture (medium picture) stored or recorded on a recording medium (i.e., a photosensitive material, a photoelectric material, a photoconductive material, etc.), instead of pictorial information values of a camera subject (real picture, actual scene), which should be considered as a direct object for a reproduced picture.

Upon producing a printed color picture from a color film original picture, color separation is performed on the basis of density information of a color film original picture which is a medium picture formed by recording the light incident from a camera subject under a given exposure condition on a photosensitive material of a color film used to take the original picture, not on the basis of picture information of the camera subject (real picture, actual scene). As well known, a light exposure E is represented by a formula: $E = It$, where I is an intensity of incident light and t is an incident time.

A photographic density is formed by development on a photosensitive material of a film on which a camera subject has been photographed, said photographic density forming an original picture (medium picture), as well known. A curve showing a correlation between the photographic densities (blackening degrees) and the light exposures E of a photographic photosensitive material is a photographic characteristic curve. The photographic characteristic curve is represented on a coordinate system, of which an axis of ordinates represents photographic densities (D) ($D = \log I_o/I$) and an axis of abscissas represents logarithmic values (log E) of light exposures E. As a matter of course, a ratio of an intensity of transparent light I to an intensity of incident light $I_o$ is used for films or dry plates and a ratio of an intensity of reflected light I to an intensity of perfect reflected light $I_o$ for photographic printing paper (reflection original).

A typical photographic characteristic curve (hereinafter called "a density characteristic curve") has a considerably complex shape, which has a downwardly-curved leg portion, an approximately linear middle portion, and an upwardly-curved shoulder portion (see FIGS. 1 and 4). The shape of the density characteristic curve is determined dependent upon the characteristics of a photosensitive material of a film, namely, the type of a photosensitive material developed by the manufacturer.

The present color separation technique is built up on the basis of the axis of ordinates (density values) of the density characteristic curve. The picture information of an original color picture, which is considered to form the basis of color separation in the conventional technique, is not in a relationship proportional to picture information of a camera subject (real picture, actual scene) and the degree of estrangement between them are dependent upon the exposure condition, developing condition, etc.

Namely, the photographic densities which are picture information values of an original color picture (medium picture) cannot be correlated in a linear relation (for example, at 45° at the ratio of 1:1, if plotted on a coordinate system) to the picture information values (for example, physical quantities such as exposure quantities or the like) relating to the light quantities incident from a camera subject.

On the other hand, it is well known that the discrimination characteristics of human visual sensation to light and shade is logarithmic and man evaluates a camera subject (real picture, actual scene) on the basis of said discrimination characteristics. Here, the human visual sensation empirically evaluates it natural what has a density change with a linear gradient.

If a printed color picture is produced on the basis of density values ($D = \log I_o/I$) of an original picture (medium picture) recorded on a photosensitive material, there are used the density information values which have been effected by the characteristics of a photographic emulsion. Accordingly, the picture information values obtained directly from the camera subject (real picture, actual scene) are not used therein.

Under the circumstances, an investigation was made by the present inventors into a method for producing a printed picture on the basis of linear picture information values such as primary (row or primitive) light exposure obtained directly from a camera subject (real picture, actual scene) instead of picture information values of an original picture (medium picture) non-linearly distorted by the characteristics of a picture recording medium such as a photographic emulsion or the like. As a result, it was found that an excellent printed picture having a picture characteristics faithful to a camera subject (real picture, actual scene) may be provided in the following manner, that is:

(1) determining values of the axis of abscissas ($\log E$) from values of the axis of ordinates ($D = \log I_o/I$) (hereinafter called the axis of ordinates and the axis of abscissas as "D axis" and "X axis", respectively) through a density characteristic curve, in other words, projecting density information values on the D axis of a original color picture (medium picture) in the range of from the highlight to shadow areas onto the X axis through the density characteristic curve (photographic characteristic curve);

(2) more practically, projecting a density value ($D_n$) on the D axis of a desired picture element (pixel) of the original picture (medium picture) onto the X axis, thereby determining a picture information value ($X_n$) on the X axis of the corresponding picture element; and (3) based on the so-determined $X_n$ value, conducting tonal conversion of the picture using a tonal conversion formula proposed by the present inventors. Incidentally, it is sufficient to read the picture information value ($X_n$) on the X axis of which scale is graduated identical to that of the D axis, as a simplified manner. Needless to say, it is not limited to this manner.

An object of the invention is to provide a novel technique for producing a reproduced picture from an original picture, in which a weight is laid on picture information obtained from a camera subject (real picture, actual scene), said camera subject being a direct object for the reproduced picture, instead of picture information of an original picture (medium picture), which is laid a weight thereon in the conventional technique, and specifically to provide a novel tonal conversion technique of pictures which is the core of said technique.

In summary, the present invention relates to a method for conducting a tonal conversion of a picture upon production of a reproduced picture from an original picture as a medium picture recorded on a given recording medium from a camera subject as a real picture, which comprises the steps of:

(i) determining a density characteristic curve which represents a correlating between density information values of the original picture plotted along the D axis of an X-D coordinate system and pictorial information values plotted along the X axis of the X-D coordinate system;

(ii) determining, from the density information value $D_n$ of a desired picture element on the original picture, the pictorial information value $X_n$ of a corresponding picture element on the camera subject in accordance with said density characteristic curve; and (iii) converting the thus-obtained pictorial information value $X_n$ of the camera subject into a tone intensity value (y) by using the following tonal conversion formula:

$$Y = y_H + \frac{\alpha(1 - 10^{-kx})}{\alpha - \beta} \cdot (y_S - y_H)$$

where x: a basic density value ($X_n - X_{Hn}$) obtained by subtracting the pictorial information value ($X_{Hn}$) of the camera subject set by the density value ($D_{Hn}$) of the brightest area (H) on the original picture from the pictorial information value ($X_n$) of the camera subject set by the pictorial information value ($D_n$) relating to the density information of the desired picture element on the original in accordance with the density characteristic curve;

y: a tone intensity value of the picture element on the reproduced picture corresponding to the desired picture element on the original picture;

$y_H$: a tone intensity value set for the brightest area (H) on the original picture or on the corresponding area of the camera subject;

$y_S$: a tone intensity value such as a dot area percentage set for the darkest area (S) on the original picture or on the corresponding area of the camera subject;

$\alpha$: a surface reflectance of a base material used for expressing the reproduced picture thereon;

$\beta$: a value determined by $\beta = 10^{-\gamma}$;

k: $\gamma/(X_{Sn} - X_{Hn})$, where $X_{Sn}$ represents the pictorial information value ($X_{Sn}$) of the camera subject determined by the density value ($D_{Sn}$) of the darkest area (S) on the original picture in accordance with the density characteristic curve; and $\gamma$: a desired optional factor.

DETAILED DESCRIPTION OF THE INVENTION

Figure 1:
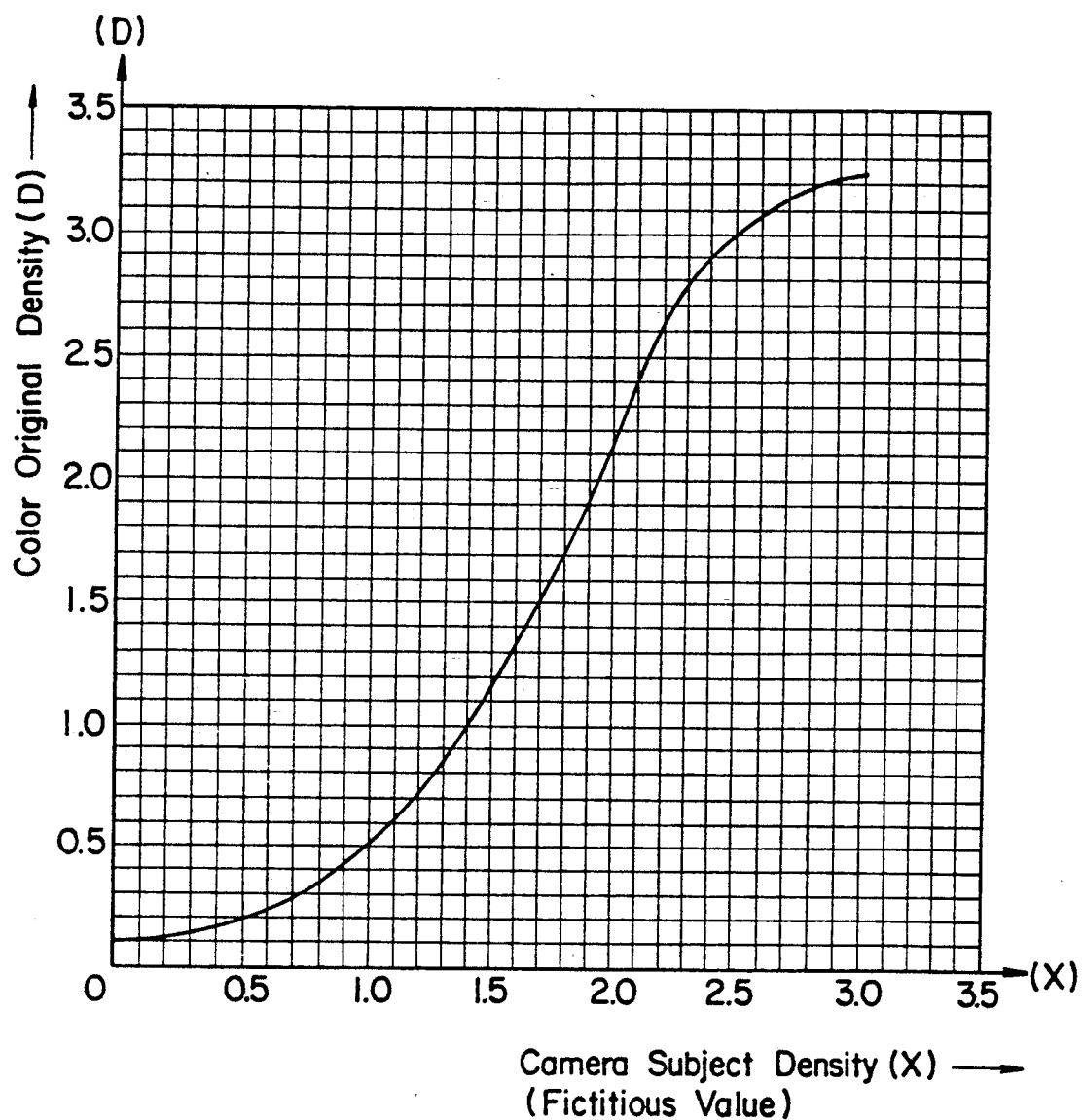
FIG. 1 is a diagrammatic illustration of a density characteristic curve of a color film.

Features of the present invention will hereinafter be described in detail.

The tonal conversion method useful upon producing a reproduced picture from an original picture (medium picture) in accordance with the present invention will be described by way of production of a printed color picture (medium picture) as a reproduced picture. It should be noted that the tonal conversion method of pictures in accordance with the present invention is not limited only to the case of production of a printed color picture, this description being only for convenience.

A color scanner system for color-separation is widely used upon production of a printed color pictures these days. Color-separation performed by a color scanner is based on density information values (including transparent and reflection originals) obtained from an original color picture (medium picture). Practically, four color plates of C (cyan), M (magenta), Y (yellow), and BK (black) are produced on the basis of density information values obtained through color filters of R (red), G (green), and B (blue) from an original color picture (medium picture).

However, the conventional technique has a limitation (disadvantage) that the density information values of an original color picture (medium picture) recorded on a recording medium such as a photographic photosensitive material are utilized therein, as previously mentioned.

The present invention is, on the contrary, based on a view that an direct object for a reproduced picture should be a camera subject (real picture, actual scene) itself, not a picture recorded on a recording medium, hence picture information values directly obtained from the camera subject should be used.

This is a basically different point between the conventional technique and the present invention.

This will be further described from a different point of view. Density values of an original picture of continuous gradation should be converted into halftone dot area percentage on a reproduced picture. It is a color separation curve to define a correlation between a picture of continuous gradation and a halftone picture. The conventional color separation curve is determined on the basis of density values on the D axis of an original picture (medium picture). On the contrary, the color separation curve is determined on the basis of picture information values on the X axis of a camera subject (real picture, actual scene) in the present invention, as mentioned above. In contrast to the conventional color-separation technique in which a color separation curve of the D axis (refer to FIGS. 3 and 6) is used, a color separation curve of the X axis (refer FIGS. 2 and 5) is adopted in the resent invention.

Next, detailed description will be made on each step of the tonal conversion method of pictures according to this invention, referring to Tables.

(i) A density characteristic curve showing a correlation between picture information values relating to densities of an original color picture (medium picture), i.e., density values ($D = \log I_0/I$), and picture information values incident from a camera subject (real picture, actual scene), i.e., logarithmic values of light exposures ($E = It$), is first determined. The so-determined density characteristic curve is then represented by functional formulae to obtain $X_n$ value ($D_n \rightarrow X_n$) in the next step.

It is adequate to represent various types of photographic characteristic curves provided by the photosensitive material manufacturer by functional formulae, for instance. So long as the density characteristic curve is rationally represented by functional formulae, the $D_n$ value on the D axis may be readily converted into the $X_n$ value on the X axis.

Figure 4:
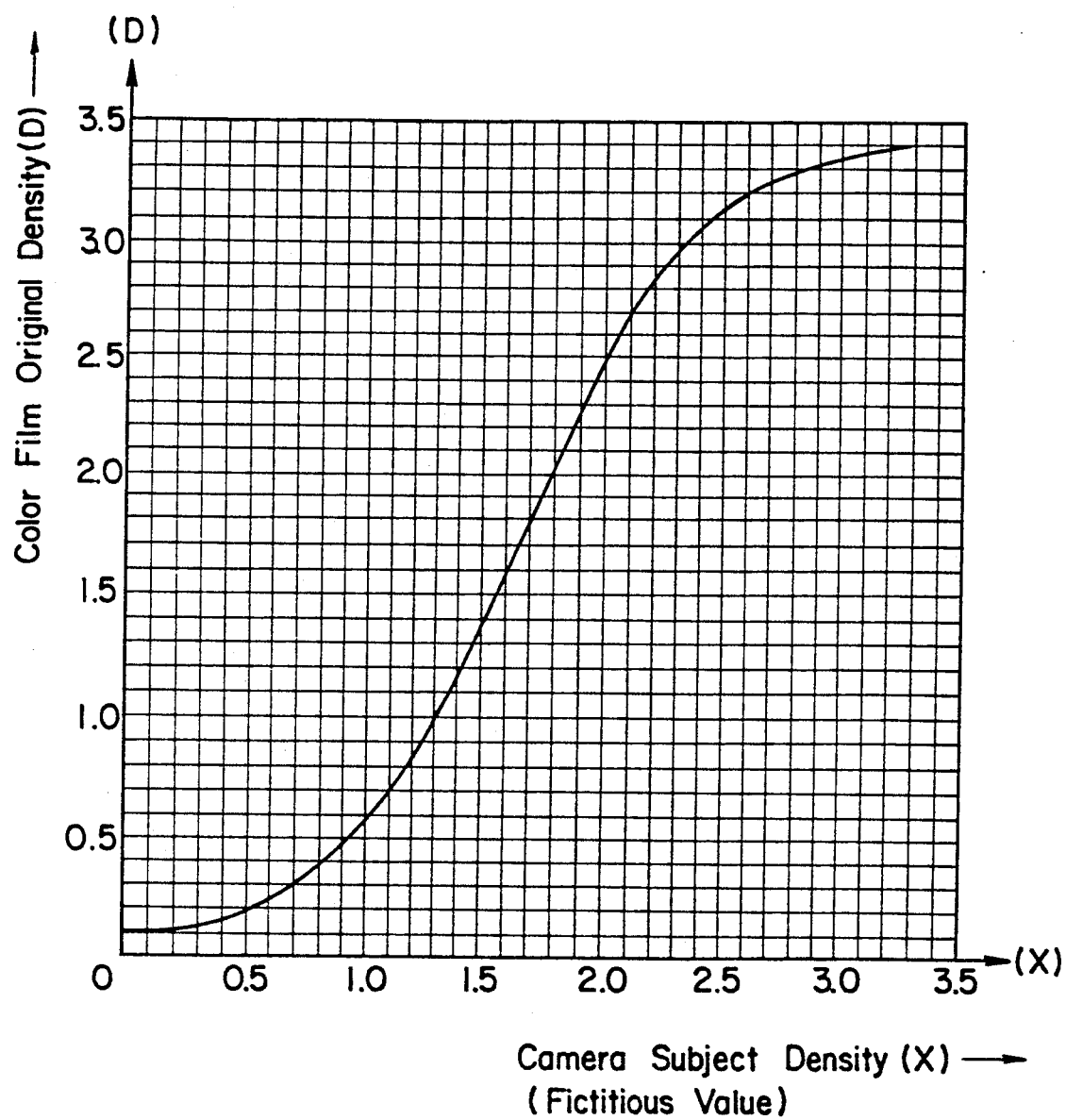
FIG. 4 is a diagrammatic illustration of a density characteristic curve which is voluntarily plotted.

Density characteristic curves used in Examples of this invention are shown in FIGS. 1 and 4. One shown in FIG. 4 was voluntarily determined by the present inventors for inspecting the generality and reliability of the tonal conversion method of pictures in accordance with this invention.

It is needless to say that a color film having a density characteristic curve of which shape is different from the one shown in FIG. 1 may be used, as proved in Examples described hereinafter. Additionally, the tonal conversion method of this invention is not restricted by the shape of a density characteristic curve.

Description will be next made on a manner for formulating the density characteristic curves shown in FIGS. 1 and 4. It is sufficient to formulate a density characteristic curve in a suitable manner, there being no limitation.

For instance, assuming [the axis of ordinates] = D = $\log I_0/I$, [the axis of abscissas] = X, and a, b, c, d and f being constants, a density characteristic curve may be formulated as follows:

(a) leg portion of the density characteristic curve (i.e., downwardly curved portion, an area having small D values)

$$D = a \cdot b^{c \cdot (X+d)+e} + f;$$

(b) approximately linear portion (i.e., an area having medium D values)

$$D = a \cdot X + b,$$

or $$D = a \cdot X^2 + bx + c;$$

and (c) shoulder portion (i.e., upwardly curved portion, an area having large D values)

$$D = \log\{b + (X+c)\} + d.$$

Details of the formulated density characteristic curves depicted in FIGS. 1 and 4 are shown in TABLE 1, where a plurality of sections are provided for formulating the density characteristic curves as accurate as possible.

TABLE 1(A)

(A Density Characteristic Curve of a Color Film Shown in FIG. 1)
Formulae for converting density values ($D_n$) of an original color picture on the D axis into values ($X_n$) on the X axis

| No. | $D_n$ | $X_n$ |
|---|---|---|
| 1 | 0.10–0.50 | X = log{(D-0.0424) ÷ 0.04576} |
| 2 | 0.50–1.00 | X = 1.00 + 0.7800(D-0.50) |
| 3 | 1.00–1.50 | X = 1.39 + 0.6200(D-1.00) |
| 4 | 1.50–2.00 | X = 1.70 + 0.4400(D-1.50) |
| 5 | 2.00–2.50 | X = 1.92 + 0.4200(D-2.00) |
| 6 | 2.50–2.80 | X = 2.13 + 0.5000(D-2.50) |
| 7 | 2.80–2.95 | X = 2.28 + 0.8000(D-2.80) |

TABLE 1(A)-continued (A Density Characteristic Curve of a Color Film Shown in FIG. 1)
Formulae for converting density values ($D_n$) of an original color picture on the D axis into values ($X_n$) on the X axis

| No. | $D_n$ | $X_n$ |
| --- | --- | --- |
| 8 | 2.95–3.20 | $X = 1.3 + e^{(1/100) \cdot 10(D-2.5608)} \div 0.3975$ |

TABLE 1(B)

(A Density Characteristic Curve Voluntarily Determined Shown in FIG. 4)
Formulae converting denstiy values ($D_n$) of an original color picture on the D axis into values ($X_n$) on the X axis

| No. | $D_n$ | $X_n$ |
| --- | --- | --- |
| 1 | 0.15–0.60 | $X = \log\{(D-0.0379) \div 0.5621\}$ |
| 2 | 0.60–0.80 | $X = 1.0000 + 0.8000(D-0.60)$ |
| 3 | 0.80–1.00 | $X = 1.1600 + 0.6500(D-0.80)$ |
| 4 | 1.00–1.20 | $X = 1.2900 + 0.5750(D-1.00)$ |
| 5 | 1.20–1.40 | $X = 1.4050 + 0.5250(D-1.20)$ |
| 6 | 1.40–1.80 | $X = 1.5100 + 0.4750(D-1.40)$ |
| 7 | 1.80–2.00 | $X = 1.7000 + 0.4500(D-1.80)$ |
| 8 | 2.00–2.20 | $X = 1.7900 + 0.4000(D-2.00)$ |
| 9 | 2.20–2.50 | $X = 1.8700 + 0.5000(D-2.20)$ |
| 10 | 2.50–3.40 | $X = 0.92 + e^{(1/100) \cdot 10(D-1.5595)} \div 0.9606$ |

The D and X values were represented by functional formulae, assuming that X axis showing the picture information values expressed in log E of a camera subject (real picture), said X axis having a scale graduated identical to that of the D axis showing the density values of an original color picture (medium picture), as shown in FIGS. 1 and 4. It should be noted that the X axis shown in FIGS. 1, 2, 4 and 5 is assigned to indicate picture densities of a camera subject (fictitious values).

This is a kind of fiction done from the following point of view, being considered to be rational by the present inventors.

Namely, this fictitious treatment is considered to be rational since in relation with a photographic characteristic curve, the logarithmic value ($\log E = \log I \times t$) of light exposure E is represented on the X axis, and this corresponds to a fact that discrimination characteristics of visual sensation of man relating to light and shade is logarithmic. Under this treatment, excellent results are available in the tonal conversion method of pictures, as hereinafter described. Incidentally, this scaling adopted in the present invention is for convenience sake, not limited only to this manner.

(ii) The present invention is, as previously described, based on picture information values provided by a camera subject (real picture, actual scene), i.e., physical quantities ($X_n$ values) relating to the light quantities represented on the X axis, not on density information values ($D_n$) of an original picture (medium picture).

The $X_n$ values may be readily determined from the $D_n$ values since the $D_n$ and $X_n$ values of the density characteristic curve are correlated by a functional formula $X = f(D)$, as shown in TABLES 1(A) and 1(B).

(iii) As described above, the picture information values provided by the camera subject (real picture) may be obtained. Strictly speaking, they are deformed by a lens system or the like more or less, but it can be ignored. The thus-determined $X_n$ values and the tonal conversion formula derived from this invention are used to determine a color separation curve of the X axis instead of a conventional color separation curve of the D axis, and it is only necessary to conduct tonal conversion of the picture thereafter.

Namely, the picture information value ($X_n$) of a desired picture element on the camera subject (real picture) is determined from the density value ($D_n$) of the corresponding picture element on the original picture (medium picture) through a predetermined density characteristic curve and said $X_n$ value is substituted in the tonal conversion formula, whereby a dot area percentage which is a gradational intensity value is calculated. The dot area percent value thus-obtained is inputted to a halftone dot generator of a color scanner to form a desired reproduced picture on the screen.

Derivation process of the tonal conversion formula of this invention will be described in brief.

The above-described tonal conversion formula which is used to determine dot area percentages (y) upon production of a printed picture in halftone, was derived from the density formula (photographic density, optical density) accepted widely, namely, $$D = \log I_o/I = \log 1/T$$

where
$I_o$: intensity of incident light,
I: intensity of light reflected or transmitted, and
$T = I/I_o$ = reflectance or transmittance.

The above general formula for the density D may be applied to plate-making and printing in the following manner.

Density ($D'$) in plate-making and printing
 $= \log I_o/I$
 $= \log$ (unit area $\times$ reflectance of paper)
   {(unit area $-$ dot area) $\times$ reflectance of
   paper $+$ dot area $\times$ surface reflectance
   of ink}
 $= \log \alpha A/[\alpha\{A - (d_1 + d_2 + \ldots + d_n)\} + \beta(d_1 + d_2 + \ldots d_n)]$ where
A: the unit area,
$d_n$: the area of each dot in the unit area,
$\alpha$: the reflectance of the printing paper, and
$\beta$: the surface reflectance of the printing ink.

The tonal conversion formula of this invention was derived on the basis of the above density formula ($D'$) relating to plate-making and printing in a manner that a $X_n$ value on the X axis is determined from a density value ($D_n$) on the D axis of a desired sample point (picture element) on the original picture of continuous gradation, a basic density value (x) is determined therefrom, and a theoretical formula which is used for determining a dot area percentage (y) of a halftone dot on a printed picture in halftone corresponding to said basic density value (x) is established. The tonal conversion formula of this invention is so established that a theoretical value calculated from said theoretical formula is agreed with an actual measured value.

In the case of multicolor plate-making, cyan (C), magenta (M), yellow (Y), and black (BK) plates are generally considered to make up a unit, the cyan plate (C) being served as a basic plate. Parameters of $y_H$ and $y_S$ are generally dealt as constants. For instance, 5% and 95% of dot area percent values are adopted as $y_H$ and $y_S$ for the C plate respectively, and 3% and 90% of dot area percent values are adopted as $y_H$ and $y_S$ for the M and Y plates, respectively. When a value measured by a densitometer (basic density value) is adopted as a density value and percent values are adopted as $y_H$ and $y_S$ in the tonal conversion formula, y value is computed as a percent value.

Numerical values set to the parameters in the tonal conversion formula are varied dependent on a purpose, that is, when the tone of a given camera subject (real picture) is desired to be faithfully reproduced on a printed picture, or when the tone of a printed picture is desired to be voluntarily adjusted (corrected or modified). One of the features of the tonal conversion formula derived from this invention is that the shape of a color separation curve of the X axis may be voluntarily changed by varying the $\gamma$ value therein. When the tone of a reproduced picture is desired to be voluntarily adjusted, the shape of the color separation curve of the X axis is changed as desired by varying the $\gamma$ value, whereby a printed pictures of one of various tones is obtained.

In the case of setting a color separation curve for the C plate, which becomes the basis of a color separation curve of the D axis, a density value of solid of the yellow ink ($\gamma=0.9-1.0$, in general) is adopted as the $\gamma$ value, thereby permitting to provide a reproduced picture of an excellent quality. The reason why such the numerical value is adopted as the $\gamma$ value is that the yellow ink has the largest excitation value to the visual sensation of man among the printing inks besides this conforms to the practical work of color separation. It is needless to say that another value may be adopted as the $\gamma$ value upon setting a color separation curve of the X axis, in this sense.

A manner for setting color separation curves of the X axis for the respective color plates, C, M, Y and B plates being considered to make up a unit, by conducting the tonal conversion formula of this invention in multicolor plate-making process is as follows. The tonal conversion formula is conducted from a standpoint of view that a color separation curve for the C plate, which is considered to be the most important plate among the four color plates, is rationally determined. Accordingly, a color separation curve of the X axis for the C plate is primarily determined by conducting the tonal conversion formula. Color separation curves of the X axis for the other M and Y plates are secondary determined by multiplying an appropriate regulating value well known in the art so as to maintain the gray and color balance on a picture. A color separation curve of the X axis for the black (BK) plate may be determined according to the practical manner in the field of art from a view point such as reduction of consumed quantities of C, M and Y inks, etc.

In the case that the density characteristic curve (photographic characteristic curve) is formed not by a single curve but by a plurality of different curves each corresponding to the respective emulsion layers of R, G and B, it is needless to say that each of the color separation curve for the respective color plates may be determined as follows. Namely, a color separation curve of the X axis for the C plate is determined through the density characteristic curve of the corresponding emulsion layer of R to begin with, color separation curves of the X axis for the M and Y plates are subsequently determined through the respective density characteristic curves of G and B so as to maintain the color and (gray) balance on a reproduced picture. In this case, it is needless to say that appropriate $\gamma$ values should be adopted for the respective M and Y plates in the tonal conversion formula.

The present invention permits to provide a printed color pictures having a picture image faithful to a camera subject (real picture, actual scene) with generality and flexibility in a systematic manner, on the assumption that density values ($D_n$) of an original color picture (medium picture) are not used therein, but picture information values ($X_n$) of the camera subject (substantial picture) are used therein upon conducting the tonal conversion formula derived from this invention.

Next, another features of the tonal conversion method of pictures according to this invention will be described.

The tonal conversion technique of pictures according to this present invention is applied not only to production of color printed pictures as previously mentioned, but to various kinds of application fields as hereinafter described. Namely, it can be applied to all fields where picture information values obtained by photographing or photograph-converting the picture information of a real picture are processed to obtain output information of a reproduced picture, utilizing information transmitting media such as light, electromagnetic wave, or the like.

Accordingly, the tonal conversion technique of pictures should be, of course, suitably conducted so as to be adapted to a given system used for producing reproduced pictures.

The tonal conversion method of this invention is primarily not limited to only a combination of density values and logarithmic values of light exposure upon setting a density characteristic curve showing a correlation between information values relating to the density information of an original picture (medium picture) and pictorial information values of a camera subject (real picture, actual scene). Any picture information of a camera subject inputted by means of a sensor of a system for producing a reproduced picture is adoptable so long as it correlates to the density information values. Physical quantity correlating to information values relating to density information of a camera subject (real picture) inputted by means of a sensor to a recording medium or the like should be interpreted in a broadest sense. Synonyms may include reflected density, transmitted density, luminance, lightness, light quantity, amplitude, current and voltage values, etc. Any one of a photographic photosensitive material, a photoelectric material, a photoconductive material, an optical disk, a magnetic disk (recording medium), etc. may be employed as a recording medium for recording an original picture (medium picture).

Upon application of the tonal conversion formula in accordance with this invention, it is free to use the formula by treating, modifying or deriving it as desired, to say nothing of its modification as follows:

$$y = y_H + E(1 - 10^{-kx}) \cdot (y_S - y_H)$$

where $$E = \frac{1}{1-\beta} - \frac{1}{1-10^{-\gamma}}$$

In the above modification given by way of example, $\alpha$ is assumed to be 1 ($\alpha=1$). This means that the surface reflectance, for example, of a printing paper (base material) to be used to express or visualizing the picture to be printed is set at 100%. As the value of $\alpha$, any desired value may be chosen. From the practical viewpoint, it may be set at 1.0. This also applies to luminance pictures such as video pictures.

According to the above exemplary modification ($\alpha=1.0$), $y_H$ and $y_S$ can be set respectively for the highlight area H and the shadow area S on the printed picture as intended, which constitutes one of remarkable features of this invention. This is evident from the fact that x becomes 0 (x=0) in the highlight area H by the definition and x becomes $X_{Sn}-X_{Hn}$ (x=$X_{Sn}-X_{Hn}$) in the shadow area S on the printed picture, namely, $$-k \cdot x = -\gamma \cdot \frac{(X_{Sn} - X_{Hn})}{(X_{Sn} - X_{Hn})} = -\gamma.$$

Upon application of the above tonal conversion formula [the modification ($\alpha=1.0$)], it is extremely important for users when presuming a resulting reproduced picture that the values of $y_H$ and $y_S$ can be set on a printed picture on any occasion as predetermined. For example, if desired values are set at $y_H$ and $y_S$ on a printed picture and the $\gamma$ value is varied (assuming $\alpha=1$), various color separation curves of the X axis are obtained. A printed picture produced on the basis of one of such color separation curves of the X axis may be easily evaluated in relation with the $\gamma$ value.

The tonal conversion technique of pictures using the tonal conversion formula derived in this invention therein is extremely useful for reproducing the gradation and color tone of a camera subject, namely, for reproducing the tone of a camera subject at the ratio of 1:1 on a printed picture in a systematic manner. It should be noted that its usefulness is not limited only to such an application. In addition to its reproducibility with fidelity to the characteristics of a camera subject, the tonal conversion formula is also extremely useful for rational modification or correction of the picture characteristics by suitably selecting the values $\alpha$, $\beta$, $\gamma$, $y_H$, and $y_S$ therein.

Having been described the applications of the tonal conversion technique of pictures of this invention specifically in relation with production of printed pictures, it should be noted that its applications are not limited only to production of printed pictures. Namely, the tonal conversion technique can be applied effectively to the following cases:

(i) when it is desired to show a gradation or tone by changing the size of each dot as seen in printed pictures as described above in detail, such as letterpress, lithography, halftone gravure and silk screen pictures (this method is called "variable-area gradation method").

The tonal conversion method of this invention can also be applied effectively to the following cases.

(ii) When it is desired to show a gradation or tone by changing the intensity of a pigment or dye (coloring material), like a printing ink, to be caused to adhere per picture element (for example, per dot), which has a uniform area, as seen in fusion-transfer type thermal transfer pictures, (silver-salt utilized) thermally-developed transfer pictures and conventional gravure pictures (this method is called "variable-density gradation method").

(iii) When it is desired to show a gradation by changing the recording density per unit area, for example, the number of dots, the number and/or size of ink droplets, or the like as seen in pictures produced by a digital copying machine (color copies, etc.), printer (ink-jet type, bubble-jet type, or the like), or a facsimile [this method is similar to the variable-area gradation method (i)].

(iv) When it is desired to obtain a CRT picture from video signals, TV signals or high-definition TV signals by adjusting the level of luminance of each unit picture element, or to obtain a halftone print or hard copy from the CRT picture.

(v) In addition to the tonal conversion of an original picture into a reproduced picture in substantially the same density (luminance and illuminance) range, when photographing is conducted in a range invisible from the standpoint of space, luminance, wavelength or time, for example, when pictorial information is inputted and converted in a low illuminance range where there is a large difference in density range between an original picture and a reproduced picture because of an extremely low contrast of the original picture (photographying by a high-sensitivity camera, or the like)—(in such a case, an emphasis is placed on the exaggeration conversion of the contrast of the picture rather than the tonal conversion of the picture).

(vi) When a diagnostic X-ray picture of poor quality is subjected to tonal conversion to achieve a correct diagnostic or to avoid any false diagnosis (this is not limited to X-ray pictures by applies to all diagnostic pictures in general).

(vii) Besides, the tonal conversion method of this invention can be applied to densitometers equipped with a density and tone conversion system to display a tone area percent and the like along with a density, printing-related equipment such as simulators for advance testing of color separation (for example, color proofing simulators) and simulators for the education of color separation, etc.

Upon application of the tonal conversion method of this invention, which uses the tonal conversion formula therein, in the various application fields described above, it is only necessary to determine pictorial information values of a camera subject (real picture) corresponding to pictorial information values and/or electrical pictorial information signals, which may be either analog or digital signals, relating to the density obtained from an original picture (including a hard original and a soft original) on the basis of density characteristic curves of information values relating to density information of the original and pictorial information values of the camera subject, subject the pictorial information values thus-determined to tonal conversion by means of the tonal conversion formula derived from this invention at a picture processing unit (tonal conversion unit) of an equipment in each of the various application fields, then control the current or voltage level in the recording portion (recording head) of the equipment or the impressing time or the like in accordance with thus-processed value, i.e., y value (tonal intensity) to change the number of dots per unit area (per picture element), the density per given area (for example, 1 dot) or the like, thereby making it possible to output a reproduced halftone or like picture having a density gradation corresponding to the camera subject (substantial picture) at the ratio of 1:1.

For example, to make original plates for a printed picture which is a halftone picture, namely, original printing plates by using the tonal conversion method of this invention which is based on the tonal conversion formula, it is only necessary to use a conventional system well known in the present field of art. The above plate-making work can be achieved by incorporating a software, which can perform the tonal conversion method of this invention, in a commercial color-separation and halftone scanning system such as an electronic color separation apparatus (color scanner or total scanner) to practise.

Described more specifically, as the conventional system, may be mentioned a system for making an original printing plate by exposing an original picture (medium picture), which is a continuous-tone picture such as a color photograph, to a spot light of a small diameter, receiving at a photoelectric conversion unit (photomultiplier) light (a pictorial information signal) reflected by or transmitted through the original picture, processing the thus-obtained electrical signal (electrical value) of pictorial information by a computer as needed, controlling an exposing light source based on a processed electrical signal (voltage) of pictorial information outputted from the computer, and then exposing a blank film to a laser spot light. It is thus only necessary to incorporate a software capable of adjusting the information values relating to the density of the original (medium picture) to the pictorial information values of the corresponding camera subject (real picture) along with converting electrical signals of continuous-tone pictorial information into electrical signals of a pictorial information by using the tonal conversion formula of this invention, for example, in a computerized processing unit of the above system, said unit being adapted to process electrical signals of pictorial information of the original picture (medium picture). Such a software may take any one of various forms such as a general purpose computer storing an algorithm of the tonal conversion formula derived in this invention as a software and having an I/F (interface) for AD (analogdigital conversion) and D/A, an electric circuit embodying the algorithm as a logic by a general purpose IC, an electric circuit with a ROM containing results computed in accordance with the algorithm, a PAL, gate array or custom IC with the algorithm embodied as an internal logic, etc. Reflecting the recent development of modularisation in particular, a computing system capable of performing tonal conversion of a picture in its density range on the basis of the tonal conversion formula derived in this invention can be easily fabricated as a module of a special-purpose IC, LSI, microprocesor, microcomputer or the like. An original printing plate of a halftone gradation having the dot area percent (value y) derived by the tonal conversion formula can be easily made by causing a photoelectrically-scanning spot light to advance successively as discrete spots and operating a laser exposing unit in unison with the scanning.

ADVANTAGES OF THE INVENTION

In application to production of reproduced pictures, for example, color printed pictures, the tonal conversion method of this invention brings about the following advantages:

(i) The conventional color separation technique, of which core is a technique for setting color separation curves of the D axis, starts primarily from an original picture (medium picture) recorded on a recording medium which is a photographic photosensitive material (emulsion). On the other hand, in the color separation technique according to this invention, of which core is a technique for setting color separation curves of the X axis, there is adopted a manner directly approaching a camera subject (real picture, actual scene) itself but a picture image of the camera subject recorded on a recording medium.

Consequently, there may be recognized a fundamental difference between the two techniques, i.e., the conventional technique and the technique of this invention. This invention therefore permits to provided printed color pictures more faithful to a camera subject (real picture, actual scene).

(ii) The conventional technique, which is a technique for setting a color separation curve of D axis, provides a different color separation curve for a given color original so that the most suitable color separation curve should be determined for the given color original on each occasion. The color separation method of this invention permits to provide a single color separation curve irrespective of the picture quality of the original picture, or irrespective of the density range determined on the density characteristic curve (the curve including a straight line) of the original picture and the shape of the density characteristic curve (including a straight line), so long as same numerical values are set at the $\alpha$, $y_H$, $y_S$ and $\gamma$ values respectively in the tonal conversion formula, thereby uniformly representing the tone of a printed color pictures obtained after being subjected to color-separation.

It is therefore dispensable in the conventional technique to carry out scanner setting-up for setting a suitable color separation curve and grouping of original color pictures for increasing the work efficiency of color-separation prior thereto.

(iii) In the color separation method of this invention, tone (arrangement of dot area % values) of a printed color picture to be reproduced may be rationally and objectively judged from the shape of a color separation curve of the X axis in advance. Namely, it is possible that the tone of a printed color picture may be confirmed or adjusted in advance by reading out the tone of a printed color picture from the shape of the color separation curve of the X axis and the arrangement of the dot area percent values. This makes it possible to omit printer's proof (hard or soft proof) exclusive of orders's proof. Change or modification of the tone of an original picture may be rationally coped with by adjusting the parameters (especially $\gamma$ value) in the tonal conversion formula derived in this invention.

(iv) The tonal conversion technique of this invention allows to provide a color separation curve of the X axis which gives an appropriate picture quality to a printed picture, even in the case that a plurality of the density characteristic curves of photographic photosensitive materials of color originals are not represented by a same density characteristic area, an original picture has nonstandard (under- or over-exposed) picture quality, to say nothing of standard quality, or an original picture has color-fog thereon. Namely, the tonal conversion method of this invention can automatically absorb or process these usual and unusual elements and simultaneously and automatically solve the problems relating to color-fog and color-balance (gray-balance), thereby making it possible to provide a printed color pictures with excellent picture quality.

EMBODIMENT OF THE INVENTION

The tonal conversion method of this invention will hereinafter be described more in detail by way of production of a color printed picture from an original color picture. It should however be borne in mind that the present invention is not limited to or by the following examples so long as the essential features thereof are not departed. The description will be made, putting an emphasis on setting of color separation curves indispensable upon production of a printed color picture in the following examples.

EXAMPLE 1

(1) A density characteristic curve used in this experiment

There was used a density characteristic curve depicted in FIG. 1 and functional formulae for said density characteristic curve shown in TABLE 1 (A).

(2) Original pictures for the experiment

General original pictures have infinite various types of picture qualities such as standard qualities (appropriately exposed), non-standard qualities (over- or under-exposed), etc. depending on exposure condition upon photographing and the like. To inspect whether the tonal conversion method of this invention can rationally cope with such color originals having various types of picture qualities, an experiment has been performed on color originals each having a different density range (DR) or a different density range on the D axis.

(3) Calculation of data for setting color separation curves of the X axis

By using the density characteristic curve depicted in FIG. 1 and the functional formulae for said density characteristic curve shown in TABLE 1 (A), $D_n$ values on the D axis of various types of color originals were converted into $X_n$ values on the X axis. Next, the $X_n$ values thus-obtained were converted into dot area percent values (y values) by means of the tonal conversion formula.

A condition for conducting the tonal conversion formula is as follows:

$x = X_n - X_{Hn}$, $y_H = 5\%$, $Y_S = 95\%$, $\gamma = 1.00$, $\beta = 10^{-\gamma} = 0.1$, $\alpha = 1.00$, and $k = \gamma / X_{Sn} - X_{Hn}$.

In TABLE 2(A), the values of $X_{Hn}$ and $X_{Sn}$ become 0.4781 and 2.2300, respectively ($X_{Hn} = 0.4781$, $X_{Sn} = 2.2300$). In other cases, refer to corresponding parts in TABLE 2.

The results of the experiment are shown in TABLES 2(A1) to 2(A3), TABLES 2(B1) to 2(B4), and TABLES 2(C1) to 2(C3).

TABLES 2(A1) to 2(A3) show over-exposed original pictures, i.e., original pictures in light tone, TABLES 2(B1) to 2(B4) show original pictures substantially appropriately-exposed, and TABLES 2(C1) to 2(C3) show original pictures under-exposed, i.e., original pictures in dark tone.

TABLE 2(A1)

| Step No. | $D_n$ | $X_n$ | $D_n'$ | $X_n'$ | dot area % |
|---|---|---|---|---|---|
| | (1) DR = 0.18–2.70 | | | | |
| 1 | 0.1800 | 0.4781 | 0.0000 | 0.0000 | 5.0000 |
| 2 | 0.4950 | 0.9952 | 0.3125 | 0.7379 | 54.3196 |
| 3 | 0.8100 | 1.2418 | 0.6250 | 1.0898 | 68.3495 |
| 4 | 1.1250 | 1.4675 | 0.9375 | 1.4119 | 77.7579 |

TABLE 2(A1)-continued

| Step No. | $D_n$ | $X_n$ | $D_n'$ | $X_n'$ | dot area % |
|---|---|---|---|---|---|
| | (1) DR = 0.18–2.70 | | | | |
| 5 | 1.4400 | 1.6628 | 1.2500 | 1.6906 | 83.9254 |
| 6 | 1.7550 | 1.8122 | 1.5625 | 1.9038 | 87.6827 |
| 7 | 2.0700 | 1.9494 | 1.8750 | 2.0995 | 90.5389 |
| 8 | 2.3850 | 2.0817 | 2.1875 | 2.2883 | 92.8471 |
| 9 | 2.7000 | 2.2300 | 2.5000 | 2.5000 | 95.0000 |
| Range | 2.5200 | 1.7519 | 2.5000 | 2.5000 | 90.0000 |

TABLE 2(A2)

| Step No. | $D_n$ | $X_n$ | $D_n'$ | $X_n'$ | dot area % |
|---|---|---|---|---|---|
| | (2) DR = 0.27–2.70 | | | | |
| 1 | 0.2700 | 0.6967 | 0.0000 | 0.0000 | 5.0000 |
| 2 | 0.5738 | 1.0576 | 0.3125 | 0.5884 | 46.8379 |
| 3 | 0.8775 | 1.2945 | 0.6250 | 0.9747 | 64.2507 |
| 4 | 1.1813 | 1.5024 | 0.9375 | 1.3137 | 75.1792 |
| 5 | 1.4850 | 1.6907 | 1.2500 | 1.6207 | 82.5239 |
| 6 | 1.7888 | 1.8271 | 1.5625 | 1.8431 | 86.6870 |
| 7 | 2.0925 | 1.9589 | 1.8750 | 2.0580 | 89.9755 |
| 8 | 2.3963 | 2.0864 | 2.1875 | 2.2659 | 92.5938 |
| 9 | 2.7000 | 2.2300 | 2.5000 | 2.5000 | 95.0000 |
| Range | 2.4300 | 1.5333 | 2.5000 | 2.5000 | 90.0000 |

TABLE 2(A3)

| Step No. | $D_n$ | $X_n$ | $D_n'$ | $X_n'$ | dot area % |
|---|---|---|---|---|---|
| | (3) DR = 0.39–2.70 | | | | |
| 1 | 0.3900 | 0.8806 | 0.0000 | 0.0000 | 5.0000 |
| 2 | 0.6788 | 1.1345 | 0.3125 | 0.4704 | 40.1604 |
| 3 | 0.9675 | 1.3647 | 0.6250 | 0.8969 | 61.2236 |
| 4 | 1.2563 | 1.5489 | 0.9375 | 1.2382 | 73.0317 |
| 5 | 1.5450 | 1.7198 | 1.2500 | 1.5548 | 81.1175 |
| 6 | 1.8338 | 1.8469 | 1.5625 | 1.7903 | 85.7832 |
| 7 | 2.1225 | 1.9715 | 1.8750 | 2.0211 | 89.4561 |
| 8 | 2.4113 | 2.0927 | 2.1875 | 2.2457 | 92.3608 |
| 9 | 2.7000 | 2.2300 | 2.5000 | 2.5000 | 95.0000 |
| Range | 2.3100 | 1.3494 | 2.5000 | 2.5000 | 90.0000 |

TABLE 2(B1)

| Step No. | $D_n$ | $X_n$ | $D_n'$ | $X_n'$ | dot area % |
|---|---|---|---|---|---|
| | (4) DR = 0.20–2.70 | | | | |
| 1 | 0.2000 | 0.5371 | 0.0000 | 0.0000 | 5.0000 |
| 2 | 0.5125 | 1.0098 | 0.3125 | 0.6981 | 52.4273 |
| 3 | 0.8250 | 1.2535 | 0.6250 | 1.0580 | 67.2602 |
| 4 | 1.1375 | 1.4753 | 0.9375 | 1.3855 | 77.0874 |
| 5 | 1.4500 | 1.6690 | 1.2500 | 1.6716 | 83.5533 |
| 6 | 1.7625 | 1.8155 | 1.5625 | 1.8879 | 87.4272 |
| 7 | 2.0750 | 1.9515 | 1.8750 | 2.0888 | 90.3957 |
| 8 | 2.3875 | 2.0828 | 2.1875 | 2.2827 | 92.7843 |
| 9 | 2.7000 | 2.2300 | 2.5000 | 2.5000 | 95.0000 |
| Range | 2.5000 | 1.6929 | 2.5000 | 2.5000 | 90.0000 |

TABLE 2(B2)

| Step No. | $D_n$ | $X_n$ | $D_n'$ | $X_n'$ | dot area % |
|---|---|---|---|---|---|
| | (5) DR = 0.30–2.80 | | | | |
| 1 | 0.3000 | 0.7505 | 0.0000 | 0.0000 | 5.0000 |
| 2 | 0.6125 | 1.0878 | 0.3125 | 0.5513 | 44.8161 |
| 3 | 0.9250 | 1.3315 | 0.6250 | 0.9496 | 63.2977 |
| 4 | 1.2375 | 1.5373 | 0.9375 | 1.2860 | 74.4086 |
| 5 | 1.5500 | 1.7220 | 1.2500 | 1.5879 | 81.8346 |
| 6 | 1.8625 | 1.8595 | 1.5625 | 1.8127 | 86.1670 |
| 7 | 1.1750 | 1.9935 | 1.8750 | 2.0317 | 89.6071 |
| 8 | 2.4875 | 2.1248 | 2.1875 | 2.2463 | 92.3678 |
| 9 | 2.8000 | 2.2800 | 2.5000 | 2.5000 | 95.0000 |
| Range | 2.5000 | 1.5295 | 2.5000 | 2.5000 | 90.0000 |

TABLE 2(B3)

| | (6) DR = 0.50–2.80 | | | |
|---|---|---|---|---|
| Step No. | $D_n$ | $X_n$ | $D_n'$ | $X_n'$ | dot area % |
| 1 | 0.5000 | 1.0005 | 0.0000 | 0.0000 | 5.0000 |
| 2 | 0.7875 | 1.2243 | 0.3125 | 0.4381 | 38.2025 |
| 3 | 1.0750 | 1.4365 | 0.6250 | 0.8525 | 59.3963 |
| 4 | 1.3625 | 1.6148 | 0.9375 | 1.2008 | 71.9112 |
| 5 | 1.6500 | 1.7660 | 1.2500 | 1.4961 | 79.7007 |
| 6 | 1.9375 | 1.8925 | 1.5625 | 1.7431 | 84.9202 |
| 7 | 2.2250 | 2.0145 | 1.8750 | 1.9814 | 88.8772 |
| 8 | 2.5125 | 2.1363 | 2.1875 | 2.2193 | 92.0497 |
| 9 | 2.8000 | 2.2800 | 2.5000 | 2.5000 | 95.0000 |
| Range | 2.3000 | 1.2800 | 2.5000 | 2.5000 | 90.0000 |

TABLE 2(B4)

| | (7) DR = 0.30–3.00 | | | |
|---|---|---|---|---|
| Step No. | $D_n$ | $X_n$ | $D_n'$ | $X_n'$ | dot area % |
| 1 | 0.3000 | 0.7505 | 0.0000 | 0.0000 | 5.0000 |
| 2 | 0.6375 | 1.1073 | 0.3125 | 0.5293 | 43.5842 |
| 3 | 0.9750 | 1.3705 | 0.6250 | 0.9197 | 62.1333 |
| 4 | 1.3125 | 1.5838 | 0.9375 | 1.2361 | 72.9698 |
| 5 | 1.6500 | 1.7660 | 1.2500 | 1.5064 | 80.0288 |
| 6 | 1.9875 | 1.9145 | 1.5625 | 1.7276 | 84.6146 |
| 7 | 2.3250 | 2.0565 | 1.8750 | 1.9373 | 88.2089 |
| 8 | 2.6625 | 2.2113 | 2.1875 | 2.0087 | 89.2776 |
| 9 | 3.0000 | 2.4358 | 2.5000 | 2.5000 | 95.0000 |
| Range | 2.7000 | 1.6853 | 2.5000 | 2.5000 | 90.0000 |

TABLE 2(C1)

| | (8) DR = 0.30–3.00 | | | |
|---|---|---|---|---|
| Step No. | $D_n$ | $X_n$ | $D_n'$ | $X_n'$ | dot area % |
| 1 | 0.6000 | 1.0780 | 0.0000 | 0.0000 | 5.0000 |
| 2 | 0.9000 | 1.3120 | 0.3125 | 0.4308 | 38.1964 |
| 3 | 1.2000 | 1.5140 | 0.6250 | 0.8028 | 57.2603 |
| 4 | 1.5000 | 1.7000 | 0.9375 | 1.1452 | 70.1727 |
| 5 | 1.8000 | 1.8320 | 1.2500 | 1.3883 | 77.1593 |
| 6 | 2.1000 | 1.9620 | 1.5625 | 1.6276 | 82.6663 |
| 7 | 2.4000 | 2.0880 | 1.8750 | 1.8596 | 86.9632 |
| 8 | 2.7000 | 2.2300 | 2.1875 | 2.1211 | 90.8238 |
| 9 | 3.0000 | 2.4358 | 2.5000 | 2.5000 | 95.0000 |
| Range | 2.4000 | 1.3578 | 2.5000 | 2.5000 | 90.0000 |

TABLE 2(C2)

| | (9) DR = 0.60–3.10 | | | |
|---|---|---|---|---|
| Step No. | $D_n$ | $X_n$ | $D_n'$ | $X_n'$ | dot area % |
| 1 | 0.6000 | 1.0780 | 0.0000 | 0.0000 | 5.0000 |
| 2 | 0.9125 | 1.3218 | 0.3125 | 0.4126 | 36.6151 |
| 3 | 1.2250 | 1.5295 | 0.6250 | 0.7642 | 55.5325 |
| 4 | 1.5375 | 1.7165 | 0.9375 | 1.0807 | 68.0410 |
| 5 | 1.8500 | 1.8540 | 1.2500 | 1.3134 | 75.1709 |
| 6 | 2.1625 | 1.9883 | 1.5625 | 1.5407 | 80.8053 |
| 7 | 2.4750 | 2.1195 | 1.8750 | 1.7627 | 85.2794 |
| 8 | 2.7875 | 2.2738 | 2.1875 | 2.0237 | 89.4932 |
| 9 | 3.1000 | 2.5551 | 2.5000 | 2.5000 | 95.0000 |
| Range | 2.5000 | 1.4771 | 2.5000 | 2.5000 | 90.0000 |

TABLE 2(C3)

| | (10) DR = 0.60–3.17 | | | |
|---|---|---|---|---|
| Step No. | $D_n$ | $X_n$ | $D_n'$ | $X_n'$ | dot area % |
| 1 | 0.6000 | 1.0780 | 0.0000 | 0.0000 | 5.0000 |
| 2 | 0.9213 | 1.3286 | 0.3125 | 0.3848 | 34.8415 |
| 3 | 1.2425 | 1.5404 | 0.6250 | 0.7100 | 53.0004 |
| 4 | 1.5638 | 1.7281 | 0.9375 | 0.9982 | 65.1232 |
| 5 | 1.8850 | 1.8694 | 1.2500 | 1.2151 | 73.3442 |
| 6 | 2.2063 | 2.0066 | 1.5625 | 1.4258 | 78.1044 |
| 7 | 2.5275 | 2.1438 | 1.8750 | 1.6364 | 82.8466 |
| 8 | 2.8488 | 2.3190 | 2.1875 | 1.9054 | 87.8082 |
| 9 | 3.1700 | 2.7062 | 2.5000 | 2.5000 | 95.0000 |
| Range | 2.5700 | 1.6282 | 2.5000 | 2.5000 | 90.0000 |

(4) Color separation curves of the X axis

Figure 2:
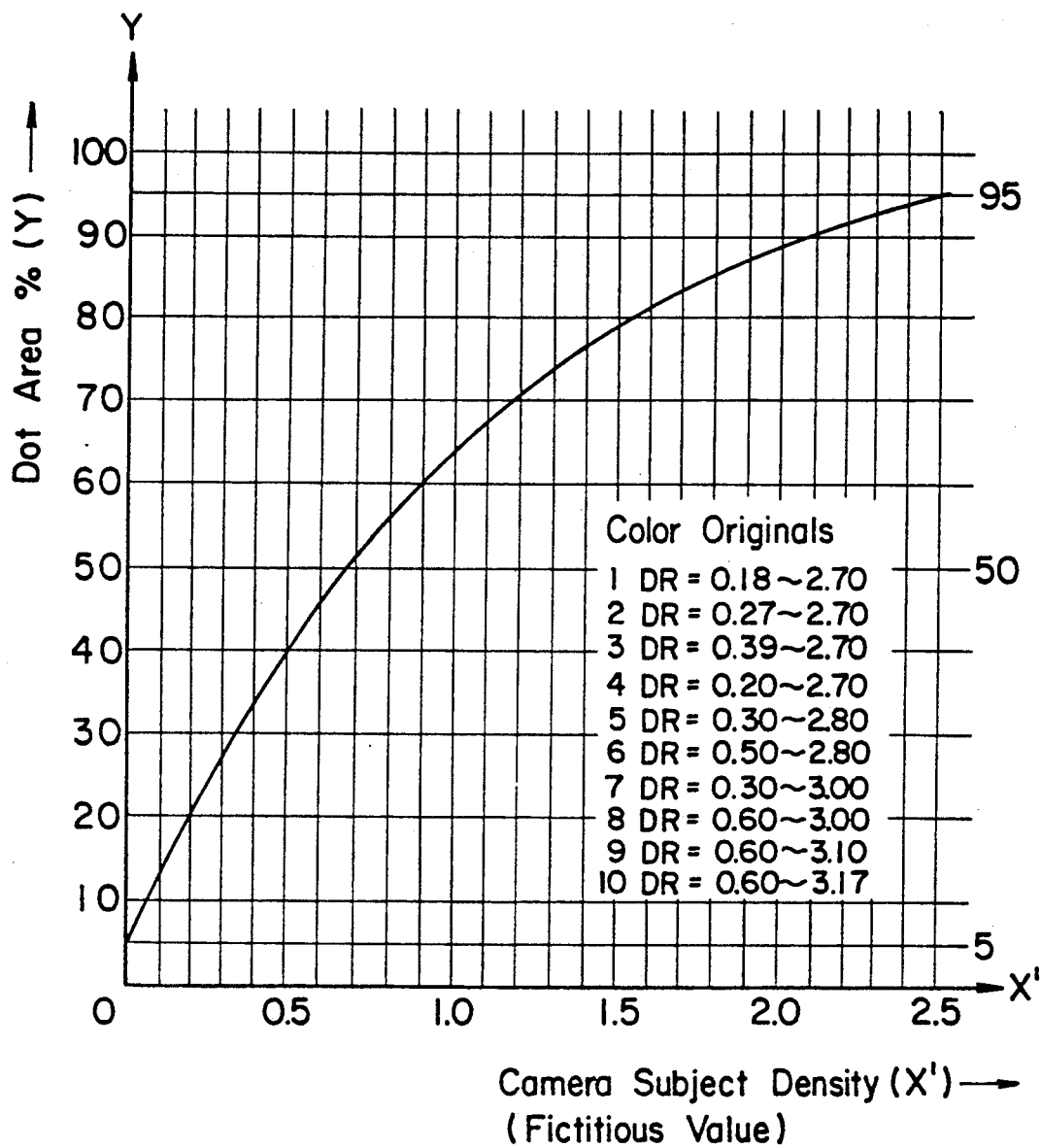
FIG. 2 is a diagrammatic illustration of color separation curves of the X axis plotted on the basis of the density characteristic curve of FIG. 1, in accordance with the present invention.
Figure 3:
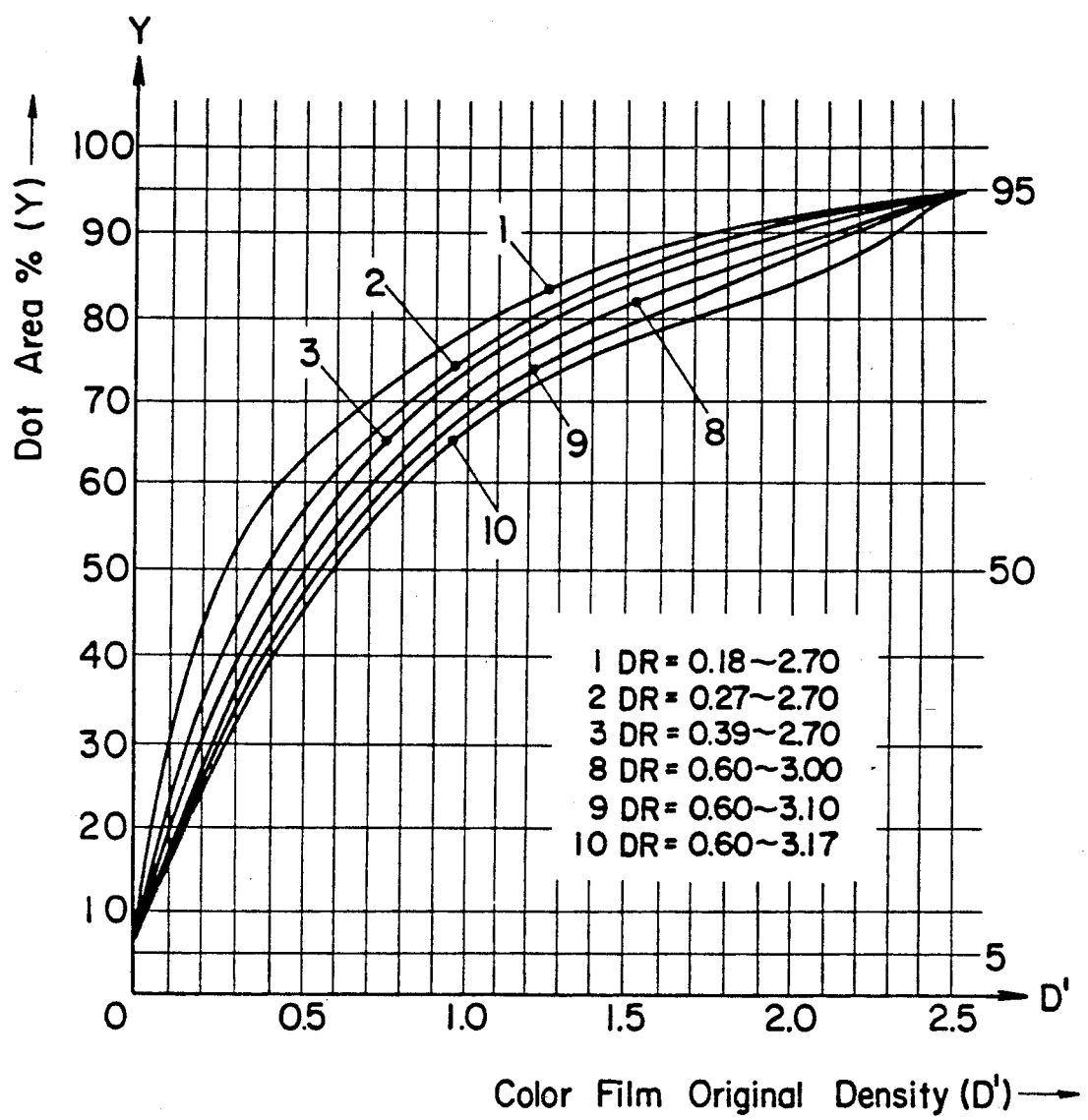
FIG. 3 is a diagrammatic illustration of color separation curves of the D axis plotted on the basis of the density characteristic curve of FIG. 1, in accordance with a conventional technique.

The data shown in from TABLE 2(A1) to TABLE 2(C3) are depicted in FIGS. 2 and 3. For plotting the data on the graphs, values adjusted to the same range (2.5000 in this experiment) were used for the sake of convenience to compare with each other. The adjusted values are shown in from TABLE 2(A1) to TABLE 2(C3) as $(D_n \rightarrow) D_n'$ and $(X_n \rightarrow) X_n'$. In the case of TABLE 2(A1), the adjustment of $D_n \rightarrow D_n'$ can be performed by using the following formula:

$$D_n' = (D_n - 1.800) \times \frac{\text{adjusted range}}{DR_n}$$
$$= (D_n - 1.800) \times \frac{2.50}{2.52}$$

Similarly, the adjustment of $X_n \rightarrow X_n'$ can be performed by using the following formula:

$$X_n' = (X_n - 0.4781) \times \frac{2.500}{1.7519}$$

FIG. 2 shows color separation curves of the X axis (relation between $X_n'$ and y, as previously described) in accordance with the present invention. FIG. 3 shows color separation curves of the D axis, which shows a relation between $D_n'$ and y. The color separation curves shown in FIG. 3 is regarded as an example for setting color separation curves in accordance with the conventional technique.

Apparent from FIGS. 2 and 3, astonishing facts can be found. Namely, even if any color original is used, color separation curves of the X axis converge into the same single curve so long as the three values, $y_H$, $y_S$ and $\gamma$, each takes an equal value. Additionally, they uniformly represent the tone of a printed color picture obtained after color separation. It shows that the arrangements of the dots of their halftone pictures come out to be adjusted to the identical, even if using color originals having different picture qualities. That is to say, printed pictures having the same quality may be produced if the tonal conversion is conducted in accordance with this invention.

On the contrary, the conventional technique provides a plurality of color separation curves each corresponding to the respective color originals, as shown in FIG. 3. It is therefore impossible to learn in advance the resulting tone of a printed picture after color separation.

It means that there necessitate in the color-separation work by a scanner a setup work for selecting an appropriate color separation curve out of a number of color separation curves and a grouping work of color originals in the pre-setup process. It is recognized from the fact that the tonal conversion method of pictures of this invention brings out excellent results.

It is easily understood from the above fact that the tonal conversion method of this invention is advantageous.

EXAMPLE 2

(1) A density characteristic curved used in this experiment

There was used a density characteristic curve depicted in FIG. 4 (X-D coordinate system), which was voluntarily determined by the present inventors, and formulae for the density characteristic curve shown in TABLE 1(B) in this experiment. The density characteristic curve used in this experiment is apparently different from one used in Example 1.

(2) Original pictures of the experiment

There were used color originals having various density ranges (DR) as similar in Example 1.

(3) Calculation of data for setting color separation curves of the X axis

The calculation was carried out in a similar manner as Example 1. A condition for conducting the tonal conversion formula of this invention was also the same as Example 1. The data shown in TABLE 3(C3), which is (N), DR=0.3-2.80, are of an original having a normal picture quality, i.e., a standard original appropriately-exposed.

TABLE 3(A1)

(1) DR = 2.00–3.40

| Step No. | $D_n$ | $X_n$ | $D_n'$ | $X_n'$ | dot area % |
|---|---|---|---|---|---|
| 1 | 2.0000 | 1.7900 | 0.0000 | 0.0000 | 5.0000 |
| 2 | 2.1750 | 1.8600 | 0.3125 | 0.1241 | 15.8010 |
| 3 | 2.3500 | 1.9450 | 0.6250 | 0.2748 | 27.3610 |
| 4 | 2.5250 | 2.0265 | 0.9375 | 0.4193 | 37.0358 |
| 5 | 2.7000 | 2.0864 | 1.2500 | 0.5255 | 43.3689 |
| 6 | 2.8750 | 2.1838 | 1.5625 | 0.6982 | 52.4322 |
| 7 | 3.0500 | 2.3478 | 1.8750 | 0.9890 | 64.7839 |
| 8 | 3.2250 | 2.6390 | 2.1875 | 1.5052 | 80.0000 |
| 9 | 3.4000 | 3.2000 | 2.5000 | 2.5000 | 95.0000 |
| Range | 1.4000 | 1.4100 | 2.5000 | 2.5000 | 90.0000 |

TABLE 3(A2)

(2) DR = 1.50–3.40

| Step No. | $D_n$ | $X_n$ | $D_n'$ | $X_n'$ | dot area % |
|---|---|---|---|---|---|
| 1 | 1.5000 | 1.5575 | 0.0000 | 0.0000 | 5.0000 |
| 2 | 1.7375 | 1.6703 | 0.3125 | 0.1717 | 19.6271 |
| 3 | 1.9750 | 1.7788 | 0.6250 | 0.3368 | 31.6703 |
| 4 | 2.2125 | 1.8763 | 0.9375 | 0.4852 | 41.0383 |
| 5 | 2.4500 | 1.9950 | 1.2500 | 0.6659 | 50.8448 |
| 6 | 2.6875 | 2.0811 | 1.5625 | 0.7970 | 57.0046 |
| 7 | 2.9250 | 2.2222 | 1.8750 | 1.0117 | 65.6160 |
| 8 | 3.1625 | 2.5142 | 2.1875 | 1.4562 | 78.8471 |
| 9 | 3.4000 | 3.2000 | 2.5000 | 2.5000 | 95.0000 |
| Range | 1.9000 | 1.6425 | 2.5000 | 2.5000 | 90.0000 |

TABLE 3(A3)

(3) DR = 1.50–3.40

| Step No. | $D_n$ | $X_n$ | $D_n'$ | $X_n'$ | dot area % |
|---|---|---|---|---|---|
| 1 | 1.0000 | 1.2900 | 0.0000 | 0.0000 | 5.0000 |
| 2 | 1.3000 | 1.4575 | 0.3125 | 0.2192 | 23.2816 |
| 3 | 1.6000 | 1.6050 | 0.6250 | 0.4123 | 36.5962 |
| 4 | 1.9000 | 1.7450 | 0.9375 | 0.5955 | 47.2170 |
| 5 | 2.2000 | 1.8700 | 1.2500 | 0.7592 | 55.3042 |
| 6 | 2.5000 | 2.0200 | 1.5625 | 0.9555 | 63.5237 |
| 7 | 2.8000 | 2.1360 | 1.8750 | 1.1073 | 68.9355 |
| 8 | 3.1000 | 2.4141 | 2.1875 | 1.4713 | 79.2083 |
| 9 | 3.4000 | 3.2000 | 2.5000 | 2.5000 | 95.0000 |
| Range | 2.4000 | 1.9100 | 2.5000 | 2.5000 | 90.0000 |

TABLE 3(B1)

(4) DR = 0.50–3.40

| Step No. | $D_n$ | $X_n$ | $D_n'$ | $X_n'$ | dot area % |
|---|---|---|---|---|---|
| 1 | 0.5000 | 0.9149 | 0.0000 | 0.0000 | 5.0000 |
| 2 | 0.8625 | 1.2006 | 0.3125 | 0.3126 | 30.0175 |
| 3 | 1.2250 | 1.4181 | 0.6250 | 0.5505 | 45.0209 |
| 4 | 1.5875 | 1.5991 | 0.9375 | 0.7485 | 54.8120 |
| 5 | 1.9500 | 1.7675 | 1.2500 | 0.9327 | 62.6453 |
| 6 | 2.3125 | 1.9263 | 1.5625 | 1.1065 | 68.9089 |
| 7 | 2.6750 | 2.0760 | 1.8750 | 1.2702 | 73.9601 |
| 8 | 3.0375 | 2.3329 | 2.1875 | 1.5513 | 81.0404 |
| 9 | 3.4000 | 3.2000 | 2.5000 | 2.5000 | 95.0000 |
| Range | 2.9000 | 2.2851 | 2.5000 | 2.5000 | 90.0000 |

TABLE 3(B2)

(5) DR = 0.15–3.40

| Step No. | $D_n$ | $X_n$ | $D_n'$ | $X_n'$ | dot area % |
|---|---|---|---|---|---|
| 1 | 0.1500 | 0.2998 | 0.0000 | 0.0000 | 5.0000 |
| 2 | 0.5563 | 0.9649 | 0.3125 | 0.5733 | 46.0234 |
| 3 | 0.9625 | 1.2656 | 0.6250 | 0.8325 | 58.5485 |
| 4 | 1.3688 | 1.4936 | 0.9375 | 1.0291 | 66.2421 |
| 5 | 1.7750 | 1.6881 | 1.2500 | 1.1971 | 71.7983 |
| 6 | 2.1813 | 1.8625 | 1.5625 | 1.3470 | 76.0799 |
| 7 | 2.5875 | 2.0447 | 1.8750 | 1.5041 | 79.9758 |
| 8 | 2.9938 | 2.2852 | 2.1875 | 1.7114 | 84.3253 |
| 9 | 3.4000 | 3.2000 | 2.5000 | 2.5000 | 95.0000 |
| Range | 3.2500 | 2.9002 | 2.5000 | 2.5000 | 90.0000 |

TABLE 3(B3)

(6) DR = 0.15–2.00

| Step No. | $D_n$ | $X_n$ | $D_n'$ | $X_n'$ | dot area % |
|---|---|---|---|---|---|
| 1 | 1.1500 | 0.2998 | 0.0000 | 0.0000 | 5.0000 |
| 2 | 0.3813 | 0.7860 | 0.3125 | 0.8156 | 57.8198 |
| 3 | 0.6125 | 1.0100 | 0.6250 | 1.1914 | 71.6236 |
| 4 | 0.8438 | 1.1885 | 0.9375 | 1.4909 | 79.6697 |
| 5 | 1.0750 | 1.3331 | 1.2500 | 1.7335 | 84.7418 |
| 6 | 1.3063 | 1.4608 | 1.5625 | 1.9477 | 88.3689 |
| 7 | 1.5375 | 1.5753 | 1.8750 | 2.1398 | 91.0659 |
| 8 | 1.7688 | 1.6852 | 2.1875 | 2.3241 | 93.2413 |
| 9 | 2.0000 | 1.7900 | 2.5000 | 2.5000 | 95.0000 |
| Range | 1.8500 | 1.4902 | 2.5000 | 2.5000 | 90.0000 |

TABLE 3(C1)

(7) DR = 1.50–2.50

| Step No. | $D_n$ | $X_n$ | $D_n'$ | $X_n'$ | dot area % |
|---|---|---|---|---|---|
| 1 | 0.1500 | 0.2998 | 0.0000 | 0.0000 | 5.0000 |
| 2 | 0.4438 | 0.8586 | 0.3125 | 0.8121 | 57.6674 |
| 3 | 0.7375 | 1.1100 | 0.6250 | 1.1775 | 71.1935 |
| 4 | 1.03125 | 1.3080 | 0.9375 | 1.4652 | 79.0630 |
| 5 | 1.3250 | 1.4706 | 1.2500 | 1.7015 | 84.1359 |
| 6 | 1.6188 | 1.6139 | 1.5625 | 1.9098 | 87.7781 |
| 7 | 1.9125 | 1.7506 | 1.8750 | 2.1084 | 90.6570 |
| 8 | 2.2063 | 1.8732 | 2.1875 | 2.2866 | 92.8281 |
| 9 | 2.5000 | 2.0200 | 2.5000 | 2.5000 | 95.0000 |
| Range | 2.3500 | 1.7202 | 2.5000 | 2.5000 | 90.0000 |

TABLE 3(C2)

(8) DR = 0.50–3.40

| Step No. | $D_n$ | $X_n$ | $D_n'$ | $X_n'$ | dot area % |
|---|---|---|---|---|---|
| 1 | 0.1500 | 0.2998 | 0.0000 | 0.0000 | 5.0000 |
| 2 | 0.5063 | 0.9208 | 0.3125 | 0.7795 | 56.2247 |
| 3 | 0.8625 | 1.2006 | 0.6250 | 1.1307 | 69.7044 |
| 4 | 1.2188 | 1.4149 | 0.9375 | 1.3997 | 77.4501 |
| 5 | 1.5750 | 1.5931 | 1.2500 | 1.6234 | 82.5798 |
| 6 | 1.9313 | 1.7591 | 1.5625 | 1.8317 | 86.4937 |
| 7 | 2.2875 | 1.9138 | 1.8750 | 2.0259 | 89.5247 |
| 8 | 2.6438 | 2.0640 | 2.1875 | 2.2144 | 91.9911 |
| 9 | 3.0000 | 2.2915 | 2.5000 | 2.5000 | 95.0000 |
| Range | 2.8500 | 1.9917 | 2.5000 | 2.5000 | 90.0000 |

TABLE 3(C3)

(N) DR = 0.30–2.80

| Step No. | $D_n$ | $X_n$ | $D_n'$ | $X_n'$ | dot area % |
|---|---|---|---|---|---|
| 1 | 0.3000 | 0.6687 | 0.0000 | 0.0000 | 5.0000 |
| 2 | 0.6125 | 1.0100 | 0.3125 | 0.5815 | 46.4671 |
| 3 | 0.9250 | 1.2413 | 0.6251 | 0.9756 | 64.2845 |
| 4 | 1.2375 | 1.4247 | 0.9375 | 1.2881 | 74.4677 |

TABLE 3(C3)-continued

| | (N) DR = 0.30-2.80 | | | | |
|---|---|---|---|---|---|
| Step No. | $D_n$ | $X_n$ | $D_n'$ | $X_n'$ | dot area % |
| 5 | 1.5500 | 1.5813 | 1.2500 | 1.5549 | 81.1197 |
| 6 | 1.8625 | 1.7281 | 1.5626 | 1.8050 | 86.0329 |
| 7 | 2.1750 | 1.8600 | 1.8750 | 2.0297 | 89.5788 |
| 8 | 2.4875 | 2.0138 | 2.1875 | 2.2918 | 92.8862 |
| 9 | 2.8000 | 2.1360 | 2.5000 | 2.5000 | 95.0000 |
| Range | 2.5000 | 1.4673 | 2.5000 | 2.5000 | 90.0000 |

(4) Color separation curves of the X axis

Figure 5:
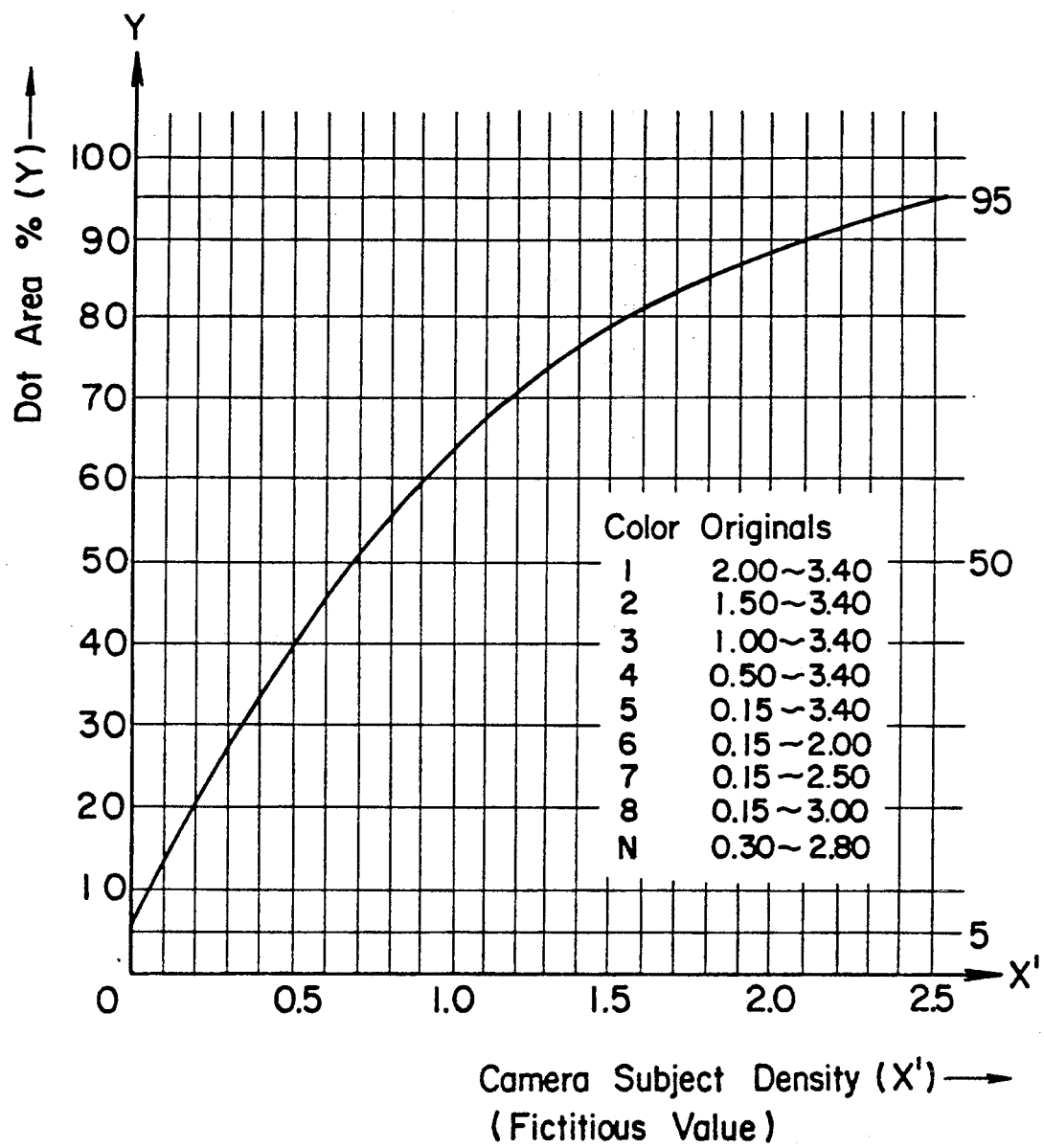
FIG. 5 is a diagrammatic illustration of color separation curves of the X axis plotted on the basis of the density characteristic curve of FIG. 4, in accordance with the present invention.
Figure 6:
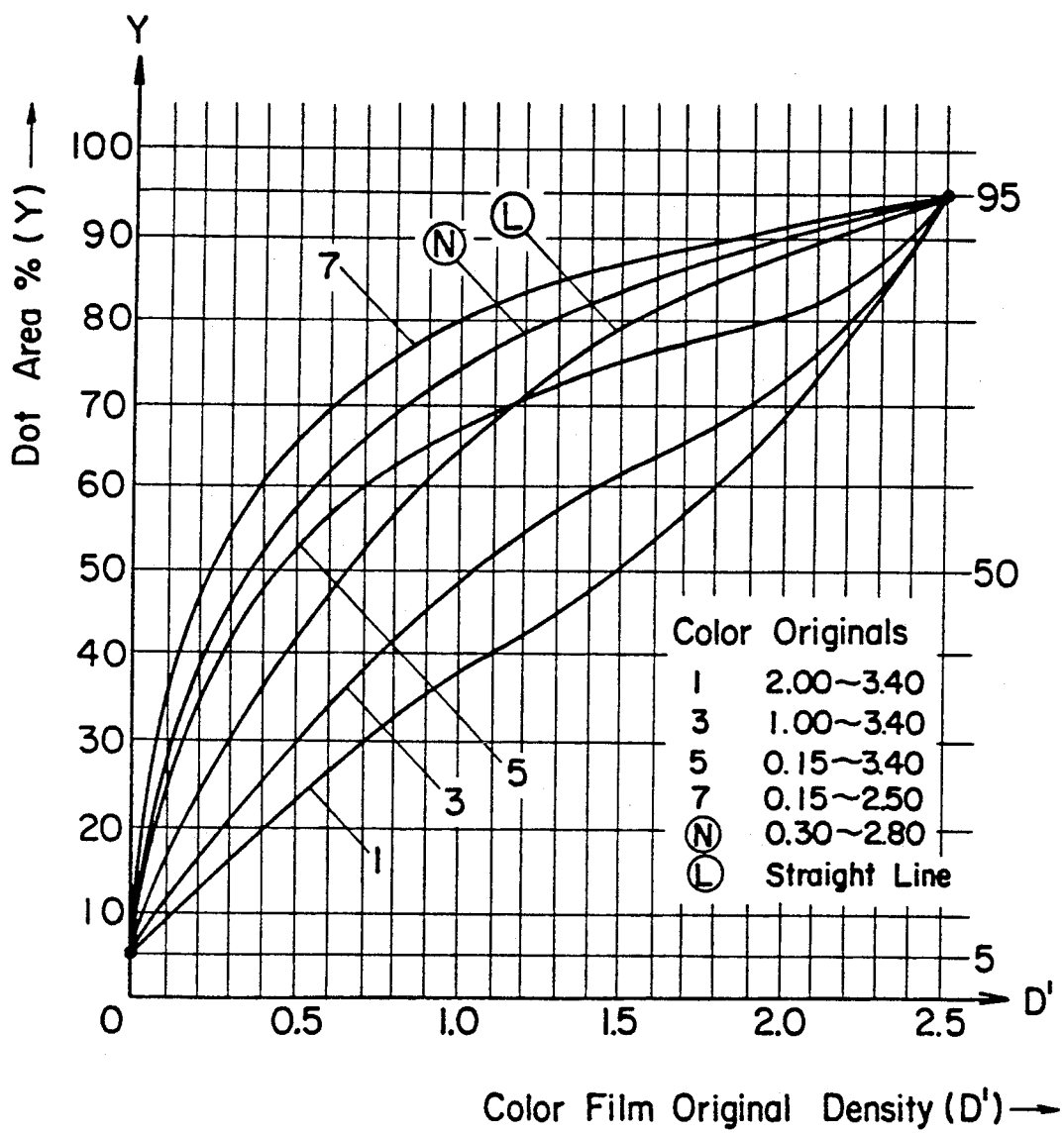
FIG. 6 is a diagrammatic illustration of color separation curves of the D axis plotted on the basis of the density characteristic curve of FIG. 4, in accordance with the conventional technique.

Color separation curves plotted on the bases of the data shown in from TABLE 3(A1) to TABLE 3(C3) are depicted in FIGS. 5 and 6. Plotting of the color separation curves was carried out in a manner quite similar to Example 1. Astonishing facts is also found from FIGS. 5 (the present invention) and 6 (the conventional technique) as same in Example 1. As superposing FIG. 5 on FIG. 2, it is found that their color separation curves are quite identical. It means that even if the premised density characteristic curves are different, an identical color separation curve of the X axis is obtained so long as the $y_H$, $y_S$ and $\gamma$ values each takes respective same values upon conducting the tonal conversion formula derived in this invention.

This has a significant meaning. Namely, the tonal conversion technique of pictures of this invention may be effectively applied, even in the case that density characteristic curves of photographic photosensitive materials of a plurality of color originals are not represented by an identical density characteristic curve, the color originals have thick color-fog thereon, or the density characteristic curves are in relation transversely parallel to each other or each of the density characteristic curves has a different gradient due to color-fog.

EXAMPLE 3

(1) Color separation curves of a linear density characteristic curve

A color separation curve of the D axis of a linear density characteristic curve is plotted in FIG. 6 [Refer (L) in FIG. 6]. It is obtained from a straight line drawn as a diagonal at 45° in a X-D coordinate system. Another examples in which color separation curves are obtained from a linear density characteristic curve utilizing the density characteristic curve shown in FIG. 1 will next be inspected.

A density characteristic curve having a linear shape was made utilizing the density characteristic curve depicted in FIG. 1 as follows:

Drawing two straight lines from two points each taking values 0.39 and 2.70 on the D axis respectively in parallel to the X axis on the X-D coordinate system shown in FIG. 1; determining two points on the density characteristic curve in which the so-drawn two straight lines cross the same, respectively; and connecting with a straight line between the so-determined two points.

From a density characteristic curve (density characteristic straight line) thus-obtained, data for setting color separation curves of the X axis were calculated. Incidentally, the condition for conducting the tonal conversion formula derived in this invention is quite same as in Example 1.

The data for calculation are shown in Table 4.

TABLE 4

| Step No. | $D_n$ | $X_n$ | $D_n'$ | $X_n'$ | dot area % |
|---|---|---|---|---|---|
| 1 | 0.3900 | 0.8806 | 0.0000 | 0.0000 | 5.0000 |
| 3 | 0.9675 | 1.2180 | 0.6251 | 0.6251 | 48.7710 |
| 5 | 1.5450 | 1.5553 | 1.2500 | 1.2500 | 73.3772 |
| 7 | 2.1225 | 1.8927 | 1.8751 | 1.8751 | 87.2188 |
| 9 | 2.7000 | 2.2300 | 2.5000 | 2.5000 | 95.0000 |
| Range | 2.3100 | 1.3494 | 2.5000 | 2.5000 | 90.0000 |

As plotting the data of TABLE 4 for setting a color separation curve of the X axis in FIG. 2, the resulting curve comes out to be identical to the color separation curve of the X axis shown in FIG. 2. It means that this invention permits to provide a completely same result irrespective whether the density characteristic curve of an original has a linear or curved shape, being thus useful for various purposes.

Next, an original picture having a density in the range of from 0.55 to 3.200 (DR=0.55-3.200) will be investigated. This is an investigation made into an underexposed original color picture having a dark tone, while the aforementioned was made into an over-exposed original color picture having a light tone. Data for setting color separation curves of the X axis are shown in TABLE 5.

TABLE 5

| Step No. | $D_n$ | $X_n$ | $D_n'$ | $X_n'$ | dot area % |
|---|---|---|---|---|---|
| 1 | 0.5500 | 1.0450 | 0.0000 | 0.0000 | 5.0000 |
| 3 | 1.2125 | 1.4838 | 0.6251 | 0.6251 | 48.7710 |
| 5 | 1.8750 | 1.9225 | 1.2500 | 1.2500 | 73.3772 |
| 7 | 2.5375 | 2.3613 | 1.8750 | 1.8750 | 87.2188 |
| 9 | 3.2000 | 2.8000 | 2.5000 | 2.5000 | 95.0000 |
| Range | 2.6500 | 1.7550 | 2.5000 | 2.5000 | 90.0000 |

A curve obtained by plotting the data of TABLE 5 comes out to be completely identical to the color separation curve of the X axis shown in FIG. 2, as similar to the aforementioned.

From the above, it would be understood that the tonal conversion method of this invention allows to provide an identical color separation curves of the X axis when the $y_H$, $y_S$, and $\gamma$ values in the tonal conversion formula each takes the same value respectively, even if the density characteristic straight lines (not curves) are different with each other.

As known well, original pictures to be subjected to color separation by a color scanner are classified into two types in general, i.e., reflection originals such as watercolor paintings, oil paintings, etc. and transparent original such as positive and negative film pictures. The reflection originals have density characteristic curves having an approximately linear shapes, of which real pictures themselves are subjected to be color separation. The real pictures are so evaluated by visual sensation of man in the light of logarithmic optical density that the real pictures have linear density gradients. On the other hand, transparent originals are negative or positive photographic films of which photosensitive materials have density characteristic curves (photographic characteristic curves) having curved shapes. It is evident that the tonal conversion method of this invention is effective to refection originals having linear density characteristic curves. The tonal conversion method of this invention is also applicable to various types of original pictures, irrespective whether the originals are of refection type or transparent type.

EXAMPLE 4

Color printed pictures were produced from the following color originals (1) and (2) in size 4"×5".

(1) Color originals (1) and (2)

To inspect whether the tonal conversion method of pictures of this invention is effective to any color original irrespective of its picture quality, color originals each having a different density values in the range of from the highlight area (H) to the shadow area (S) shown in TABLE 6 are prepared.

Incidentally, in TABLE 6 originals in light tone, standard originals, and originals in dark tone were photographed under over-exposure, normal-exposure, and under-exposure conditions, respectively.

TABLE 6

| | H area density | S area density | Color separation curves of the X axis |
|---|---|---|---|
| (1) Still life, indoor (3 types) | | | |
| Original in light tone | 0.18 | 2.70 | Example 1 TABLE 2(A1) |
| Standard original | 0.30 | 2.80 | Example 1 TABLE 2(B2) |
| Original in dark tone | 0.60 | 3.10 | Example 1 TABLE 2(C2) |
| (2) Woman in western clothes, indoor (3 types) | | | |
| Original in light tone | 0.27 | 2.00 | Example 1 TABLE 2(A2) |
| Standard original | 0.30 | 3.00 | Example 1 TABLE 2(B4) |
| Original in dark tone | 0.60 | 3.17 | Example 1 TABLE 2(C3) |

(ii) Setting of color separation curves of the X axis

There are shown color separation curves of the X axis for producing the C plate used in color separation of the color originals in TABLE 6. The data for setting color separation curves of the X axis for various density range (DR) obtained in Example 1 were utilized therein (refer from TABLE 2(A1) to TABLE 2(C3) and FIG. 2).

A condition of the parameters in the tonal conversion formula for setting a color separation curve of the X axis for the C plate is as follows:

$y_H = 5\%$, $y_S = 95\%$, $\alpha = 1.00\%$, $\gamma = 1.00$, and $\beta = 0.10$.

On the other hand, color separation curves of the X axis for the M and Y plates were so determined that $y_H$ is 3% ($y_H = 3\%$), $y_S$ is 90% ($y_S = 90\%$), and the halftone dots in the medium tone area becomes 10% less than those of the C plate. The same color separation curve was used for both the M and Y plates. A color separation curve of the X axis for BK plate was determined in accordance with the ordinary practical manner.

(iii) Color separation and color-proofreading

Color separation was performed by employing Magnascan M-645 (tradename, manufactured by Crosfield Electronics Limited) as a color scanner. Relating to color proofing, color-proofing printed pictures were produced by a Chromarine proof press (manufactured by Du Pont), then evaluation was made on picture qualities of the resulting proofing pictures.

(iv) Results

The color-proofing printed pictures for the respective three originals (indoor still life and indoor woman in western clothes) thus-produced had the picture qualities in a substantially same tone, as expected. Every one of them is well expressed or visualized in its highlight and shadow parts and has a density gradient in the range of from the highlight to shadow parts, which is felt natural to visual sensation of man.

Having been described the tonal conversion method according to the present invention, putting an emphasis on production of printed pictures as reproduced pictures, it is needless to say that the tonal conversion method of this invention are also effective to production of another types of reproduced pictures.

We claim:

1. A tonal conversion method for producing a tonal converted reproduced picture from an original picture recorded on a given recording medium, the original being an image of a camera subject, which comprises the steps of:

(i) determining a density characteristic curve which represents a correlation between density information values of the original picture plotted along the D axis of an X-D coordinate system and pictorial information values of the camera subject plotted along the X axis of the X-D coordinate system;

(ii) reproducing the original picture from the recording medium and determining an image density of picture elements of the original picture to obtain corresponding density information values D of the picture elements of the original picture;

(iii) determining, from the density information values ($D_n$) of a desired picture element on the original picture, the pictorial information value $X_n$ of a corresponding picture element on the camera subject in accordance with said density characteristic curve;

(iv) converting the thus-obtained pictorial information value $X_n$ of the camera subject into a tone intensity value (y) by using the following tonal conversion formula:

$$y = y_H + \frac{\alpha(1 - 10^{-kx})}{\alpha - \beta} \cdot (y_S - y_H)$$

(v) generating and recording the tonal converted reproduced picture having picture elements in accordance with thus obtained corresponding tone intensity values;

where x: a basic density value ($X_n - X_{Hn}$) obtained by subtracting the pictorial information value ($X_{Hn}$) of the camera subject set by the density value ($D_{Hn}$) of the brightest area (H) on the original picture from the pictorial information value ($X_n$) of the camera subject set by the pictorial information value ($D_n$) relating to the density information of the desired picture element on the original in accordance with the density characteristic curve;

y: a tone intensity value of the picture element on the reproduced picture corresponding to the desired picture element on the original picture;

$y_H$: a tone intensity values set for the brightest area (H) on the original picture or on the corresponding area of the camera subject;

$y_S$: a tone intensity value such as a dot area percentage set for the darkest area (S) on the original picture or on the corresponding area of the camera subject;

$\alpha$: a surface reflectance of a base material used for expressing the reproduced picture thereon;

$\beta$: a value determined by $\beta = 10^{-\gamma}$;

k: $\gamma/(X_{Sn} - X_{Hn})$, where $X_{Sn}$ represents the pictorial information value ($X_{Sn}$) of the camera subject determined by the density value ($D_{Sn}$) of the darkest area (S) on the original picture in accordance with density characteristic curve; and $\gamma$: a desired optional factor.

2. The tonal conversion method according to claim 1, wherein the $X_n$ value is determined from the $D_n$ value on the X-D coordinate system representing the density characteristic curve, said D and X axes having an identical scale.

3. The tonal conversion method according to claim 1, wherein the recording medium is a photographic photosensitive material.

4. The tonal conversion method according to claim 1, wherein the recording medium is a photoelectric material.

5. The tonal conversion method according to claim 1, wherein the recording medium is a photoconductive material.

6. The tonal conversion method according to claim 1, wherein the recording medium is an optical disc.

7. The tonal conversion method according to claim 1, wherein the recording medium is a magnetic disc.

8. The tonal conversion method according to claim 1, wherein the density characteristic curve is a photographic characteristic curve representing a correlation between blackening degrees which are densities D of the photographic photosensitive material and logarithmic values (log E) of light exposures E.

9. The tonal conversion method according to claim 1, wherein the density characteristic curve represents the density characteristic of a photoelectric surface.

10. The tonal conversion method according to claim 1, wherein the density characteristic curve represents the density characteristic of a photoconductive material.

11. The tonal conversion method according to claim 1, wherein the reproduced picture is a halftone picture.

12. The tonal conversion method according to claim 1, wherein the pictorial information values are light quantities incident from the camera subject.

13. The tonal conversion method according to claim 1, wherein the tone intensity value (y) is a dot area percentage.

* * * * *